(12) United States Patent
Appelman et al.

(10) Patent No.: US 6,539,421 B1
(45) Date of Patent: Mar. 25, 2003

(54) MESSAGING APPLICATION USER INTERFACE

(75) Inventors: Barry Appelman, Great Falls, VA (US); Andrew L. Wick, Fairfax, VA (US)

(73) Assignee: America Online, Inc., Dulles, VA (US)

( * ) Notice: Subject to any disclaimer, the term of this patent is extended or adjusted under 35 U.S.C. 154(b) by 0 days.

(21) Appl. No.: 09/404,757

(22) Filed: Sep. 24, 1999

(51) Int. Cl.[7] .............................................. G06F 15/16
(52) U.S. Cl. ........................ 709/206; 345/758; 707/534
(58) Field of Search ........................ 709/206; 345/751, 345/758, 759, 752; 707/534, 526, 104

(56) References Cited

U.S. PATENT DOCUMENTS

| | | | | |
|---|---|---|---|---|
| 5,805,911 A | * | 9/1998 | Miller | 707/534 |
| 5,832,497 A | * | 11/1998 | Taylor | 707/104 |
| 5,845,300 A | | 12/1998 | Comer et al. | 707/508 |
| 6,208,339 B1 | * | 3/2001 | Atlas et al. | 345/780 |
| 6,279,016 B1 | * | 8/2001 | De Vorchik et al. | 707/526 |
| 6,377,965 B1 | * | 4/2002 | Hachamovitch et al. | 707/534 |

OTHER PUBLICATIONS

Polito, Julie. "Track your key contacts; Multiactive Maximizer 5.0 vs. Polaris Packrat Pro 6.1" PC Computing, Oct. 1, 1998 p. 120 (abstract).*

Pioch, Nicholas. A Short IRC Primer [online], Jan. 1997. [retrieved on Mar. 14, 2002] Retrieved from the Internet: <URL: http://www.irchelp.org/irchelp/ircprimer.html>.*

* cited by examiner

*Primary Examiner*—Zarni Maung
*Assistant Examiner*—Gregory Clinton
(74) *Attorney, Agent, or Firm*—Fish & Richardson P.C.

(57) ABSTRACT

A messaging application user interface has an input element for receiving electronic messages and an output element for displaying electronic messages. The messaging application user interface can be implemented so as to maintain a subset of the plurality of potential message recipients, the subset being determined using a predetermined criterion. The messaging application user interface also can be implemented so as to auto-complete a partially entered address based on the subset of potential message recipients. A set of user-selectable signals that modify auto-completion behavior also can be used with the messaging application user interface. The messaging application user interface can be used in an instant messaging system to allow a user to send instant messages to and exchange comments with a plurality of other users without having to switch among several instant message windows.

32 Claims, 21 Drawing Sheets

| ADDRESS | ONLINE | TIME STAMP |
|---|---|---|
| Bjones1934 | Y | 10:41:20 |
| EricBosco | N | N/A |
| Flatt | N | N/A |
| FRsnafu | N | N/A |
| jimgromada | N | N/A |
| JohnBoy | Y | 11:20:11 |
| jmp0mn | N | N/A |
| KCSmith11 | Y | 12:00:03 |
| MoonBoy | N | N/A |
| mroe1934 | Y | 13:10:23 |
| PhillipsJC | Y | 6:34:11 |
| ronny | Y | 7:04:12 |
| Tom | Y | 8:56:23 |
| Wendy | N | N/A |

FIG. 9

MESSAGING APPLICATION USER INTERFACE

TECHNICAL FIELD

This application relates to a messaging application (e.g., e-mail, instant messaging, chat rooms, etc.) user interface.

BACKGROUND

The computer system 100 illustrated in FIG. 1 represents a typical hardware setup for executing software that allows a user to perform tasks such as communicating with other computer users, accessing various computer resources, and viewing, creating, or otherwise manipulating electronic content—that is, any combination of text, images, movies, music or other sounds, animations, 3D virtual worlds, and links to other objects. The system includes various input/output (I/O) devices (mouse 103, keyboard 105, display 107) and a general purpose computer 100 having a central processor unit (CPU) 121, an I/O unit 117 and a memory 109 that stores data and various programs such as an operating system 111, and one or more application programs 113. The computer system 100 also typically includes some sort of communications card or device 123 (e.g., a modem or network adapter) for exchanging data with a network 127 via a communications link 125 (e.g., a telephone line).

As shown in FIG. 2, a user of a computer system can access electronic content or other resources either stored locally at the user's own client system 202 (for example, a personal or laptop computer) or remotely at one or more server systems 200. An example of a server system is a host computer that provides subscribers with online computer services such as e-mail, e-commerce, instant messaging, chat rooms, Internet access, online games, electronic newspapers and magazines, etc. Users of a host computer's online services typically communicate with one or more central server systems 200 through client software executing on their respective client systems 202.

In practice, a server system 200 typically will not be a single monolithic entity but rather will be a network of interconnected server computers, possibly physically dispersed from each other, each dedicated to its own set of duties and/or to a particular geographical region. In such a case, the individual servers are interconnected by a network of communication links, in a known fashion. One such server system is "America Online 4.0" from America Online, Incorporated of Virginia.

One increasingly popular computer network-based activity is referred to as "instant messaging." An instant message is a form of electronic communication between users of a computer network in which a window pops-up on the recipient's computer screen "instantly" and without the recipient having to access an e-mail program or otherwise check for messages. An instant message appears essentially as soon as the message sender clicks the send button subject to any time or propagation delays the message may have encountered on the network. In comparison to most e-mail applications, instant messaging enables users to communicate with each other in a more dynamic, urgent and interactive manner.

FIG. 3 is a screen shot of an Instant Message (IM) window 130 as used in AOL's Instant Messenger ("AIM") system. As shown therein, the window 130 includes a text display area 131 and text entry area 132. Both users involved in the IM under consideration (i.e., sender and recipient) would have a similar window displayed on his or her computer monitor. When one user (PhillipsJC) types a comment 134 in text entry area 132 and clicks the Send button 133 (or, depending on the configuration, presses the "ENTER" key on the keyboard), the entered text (e.g., "Hey, did you see the game last night?") is displayed in the text display area 131 of the window 130 such that it is visible to both users. After FRsnafu enters a comment 135 in response and clicks the Send button 133, that comment 135 appears in the text display area 131 underneath the previous comment 134. This exchange of comments continues indefinitely until the users decide to terminate the exchange.

Typically, instant messages can be sent to another user only when that user is presently signed on to the computer service. Users who are signed off are unavailable to receive instant messages. Accordingly, another popular innovation introduced by America Online is the "Buddy List," which allows users to monitor when other specified users ("buddies") are signed onto and/or off of the computer service under consideration (e.g., AOL Instant Messenger).

As shown in FIG. 4, the Buddy List is implemented as a window 140 that lists specified users, or buddies, who are signed on to the AIM system. In the example shown, the Buddy List for user "PhillipsJC" indicates that four of PhillipsJC's buddies 141–144 currently are signed on to the system and thus available to receive instant messages. The Buddy List is updated based on information received from a server to add or delete names of buddies as they sign on and off, respectively. Such Buddy List updates can be accompanied by various audible and visual indications to help notify the user that a buddy has signed on or off.

Users may send instant messages to, and exchange comments with, more than one other user at a time. Conventional instant message client software typically creates a separate instant message window for each user that is sent an instant message. For example, as shown in FIG. 5, if a user sends three instant messages to three other users, one to each of the users, three separate instant message windows 130a, 130b, and 130c are created. To change from one instant message window to another, the user typically must move and/or press a button on the mouse, or press a sequence of keys on the keyboard, to activate the desired instant message window.

The present inventors recognized that some users may find it undesirable to have to switch between instant message windows in order to send instant messages to and exchange comments with more than one other user at a time. Therefore, the present inventors recognized that it would be desirable to provide users with a user interface through which a user can send messages to and exchange comments with one or more users without having to switch among several different windows.

SUMMARY

Implementations may include one or more of the following features. In one aspect, a computer-implemented method of addressing a message to a member of a plurality of potential message recipients may include maintaining a subset of a plurality of potential message recipients. Each potential message recipient may have an associated address, and the subset may be determined using a predetermined criterion. The method also may include auto-completing a partially entered address based on the subset of potential message recipients.

In another aspect, a method of addressing electronic messages to users of a computer network may include providing a set of user-selectable signals that modify auto-completion behavior and auto-completing a partially entered address for a message based on entry of one or more of the set of signals.

In another aspect, a method of exchanging instant messages among users of a computer network may include providing an instance of a user interface having an element for receiving addresses of instant message recipients. The method also may include allowing a user to send independent instant messages to different recipients by specifying an intended recipient's address in the instance of the user interface element.

In another aspect, an instant messaging user interface may include a user interface element having an input element for receiving instant messages for more than one separate instant message exchange and an output element for displaying instant messages for more than one separate instant message exchange.

In another aspect, an instant messaging system may include an instant message server and a plurality of clients connected to the instant message server via a network. Each client may have software embodied in a computer-readable medium including instructions for causing the client to provide a user interface having an element for receiving addresses. The software also includes instructions for causing the client to allow a user to address instant messages to a first recipient via the user interface element while participating in a first instant message exchange and to allow the user to address instant messages to another recipient via the user interface element while participating in another instant message exchange separate from the first instant message exchange.

In another aspect, a protocol for addressing a message to a member of a plurality of potential message recipients may include one or more user-selectable signals for modifying auto-completion behavior, and a predetermined criterion for selecting a subset of the plurality of potential message recipients. Each potential message recipient may have an associated address.

One or more of the following advantages may be realized. The user interface allows a user to send instant messages to and exchange comments with a plurality of other users without having to switch among several instant message windows and without having to clutter up the user's display screen with several instant message windows. Moreover, automatically completing the address of a message based on a partially entered address allows a user to address the message without having to enter a complete address, thereby saving time and effort. For example, the user interface can be configured to allow the user to address a message to the person with whom the user last corresponded using a single keystroke. Also, by using only a subset of the entire group of potential message recipients (e.g., each member of the subset being selected based on predetermined criteria such as the potential recipient being on a buddy list and currently being online), the address auto-completion feature can function properly with less input from the user (e.g., with fewer keystrokes) than would be required if the entire group of potential message recipients was used.

Further advantages and features will be apparent from the following description, including the drawings and the claims.

DRAWING DESCRIPTIONS

FIG. 9 is a schematic diagram of an address list.

Like reference numbers and designations in the various drawings indicate like elements.

DETAILED DESCRIPTION

Figure 1:
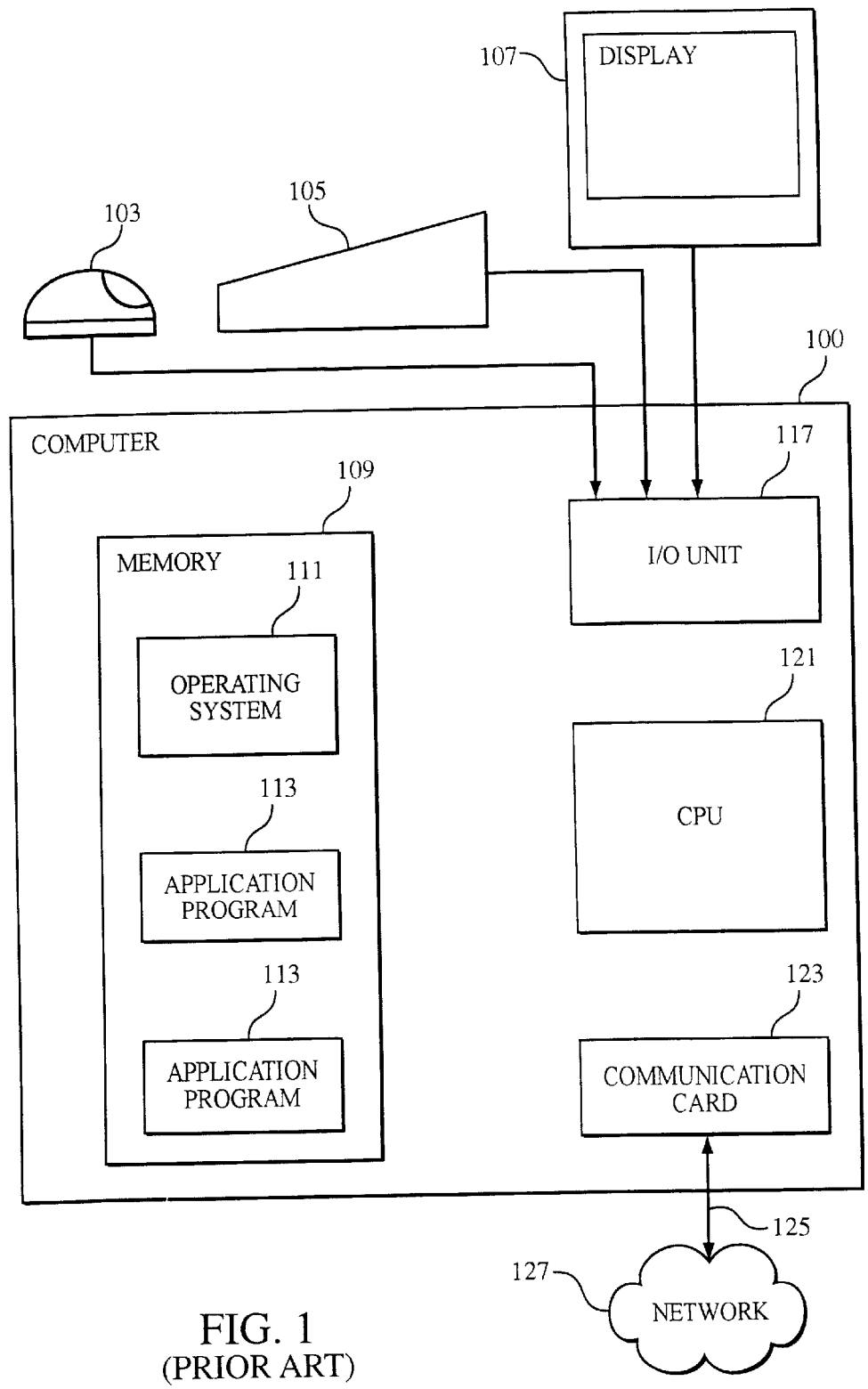
FIG. 1 is a block diagram of a computer system.
Figure 2:
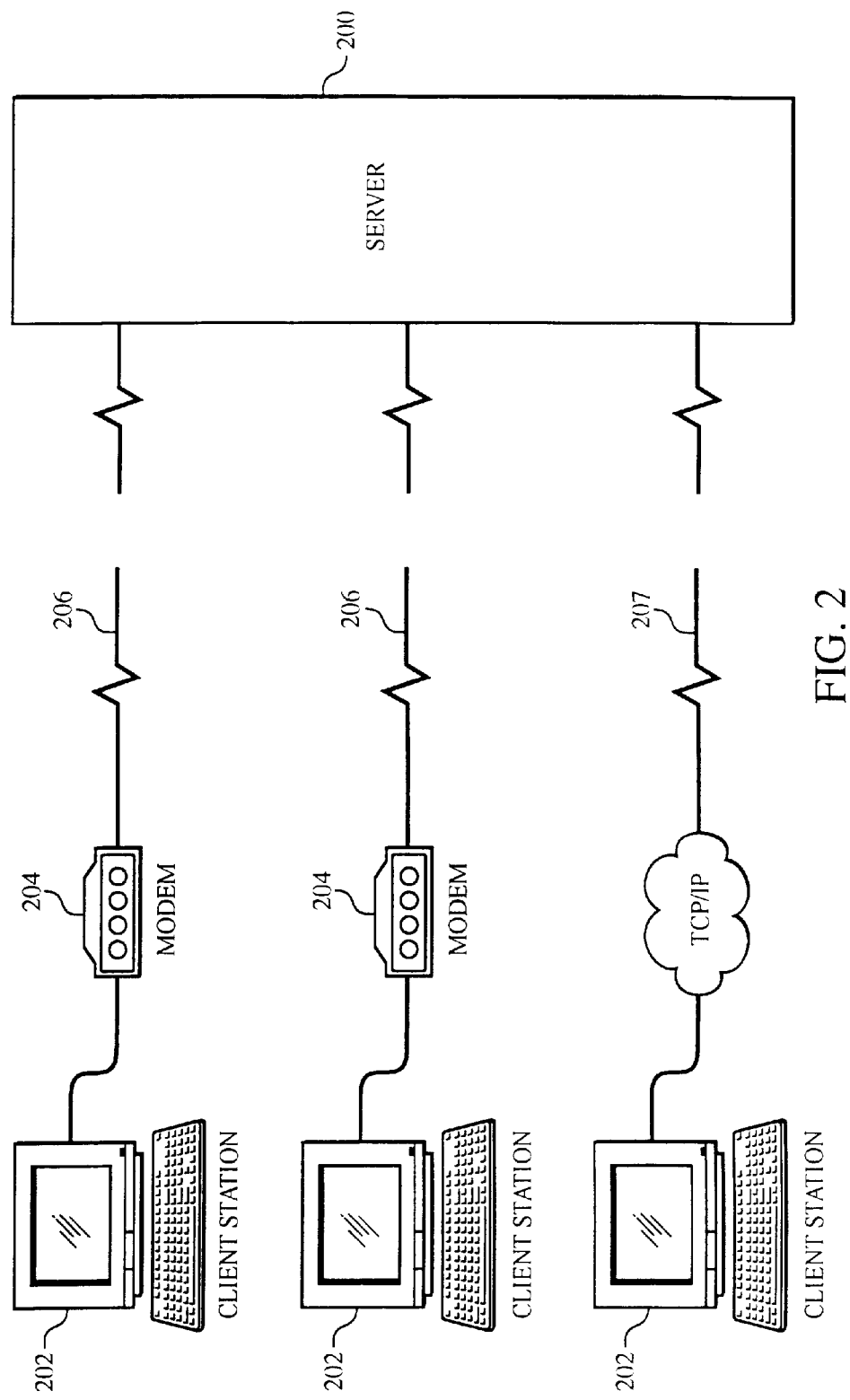
FIG. 2 shows a typical network computing environment.
Figure 3:
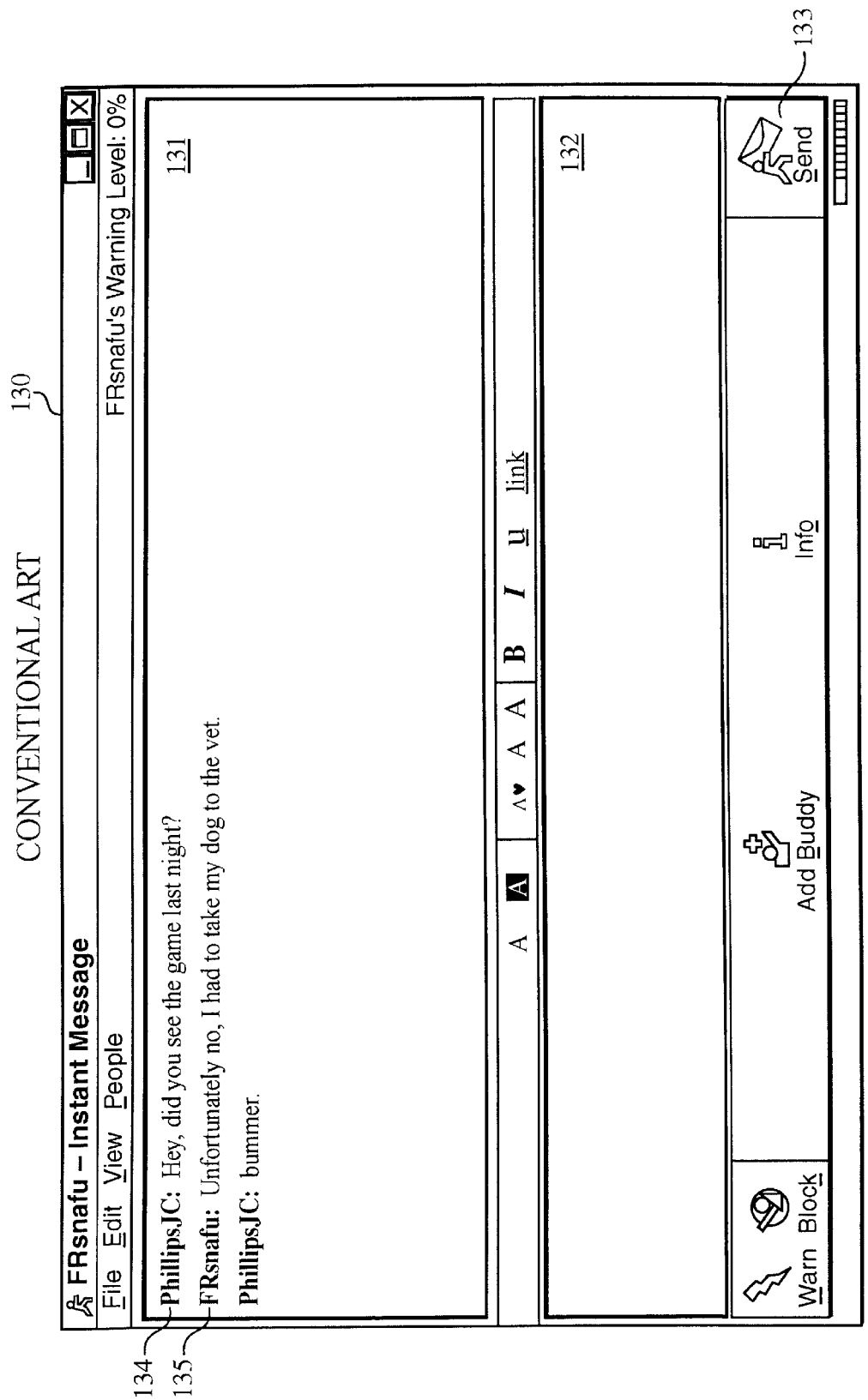
FIG. 3 is a screen shot of an "Instant Message" window.
Figure 4:
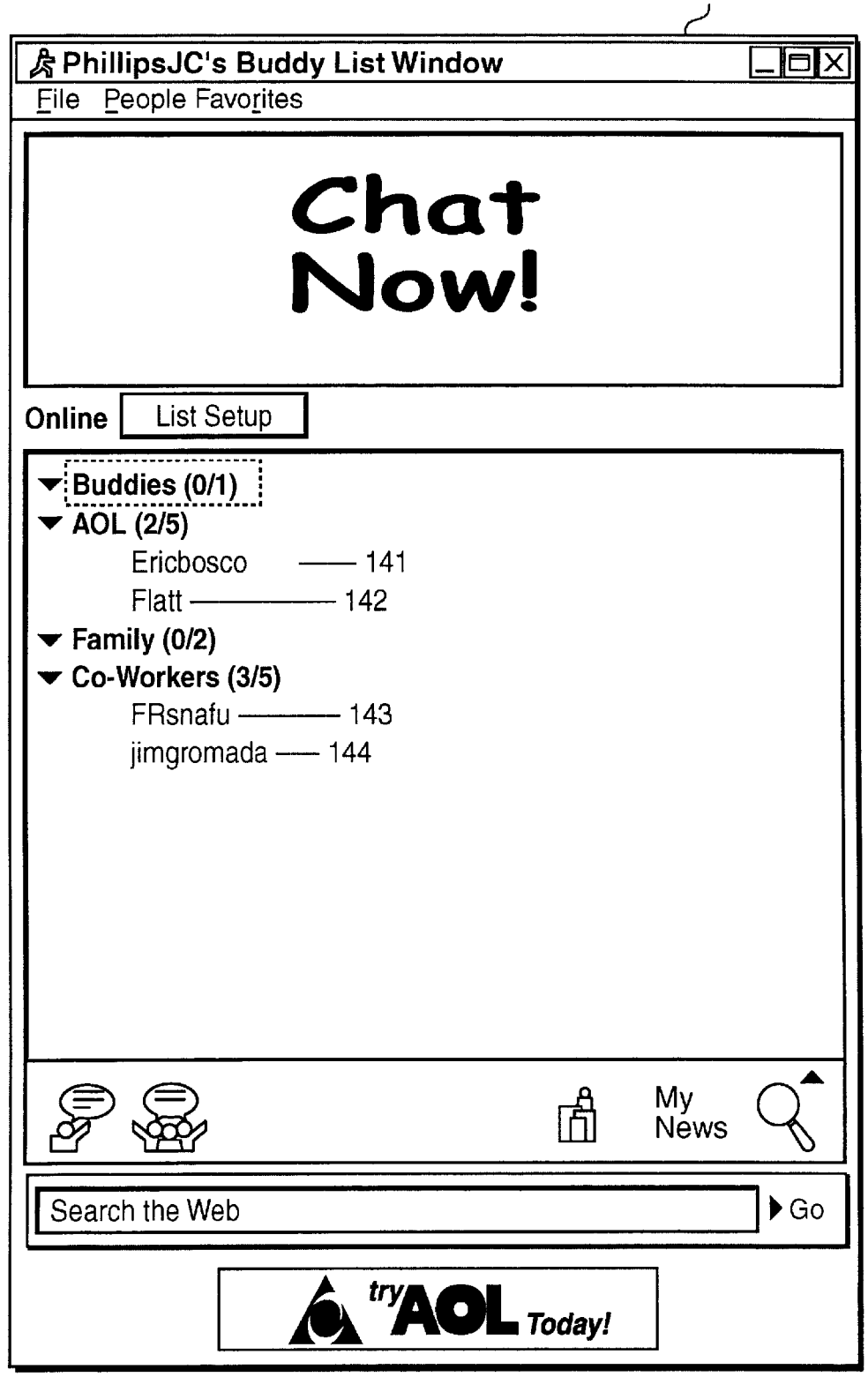
FIG. 4 is a screen shot of a "Buddy List" window in AOL's Instant Messenger for Windows.
Figure 5:
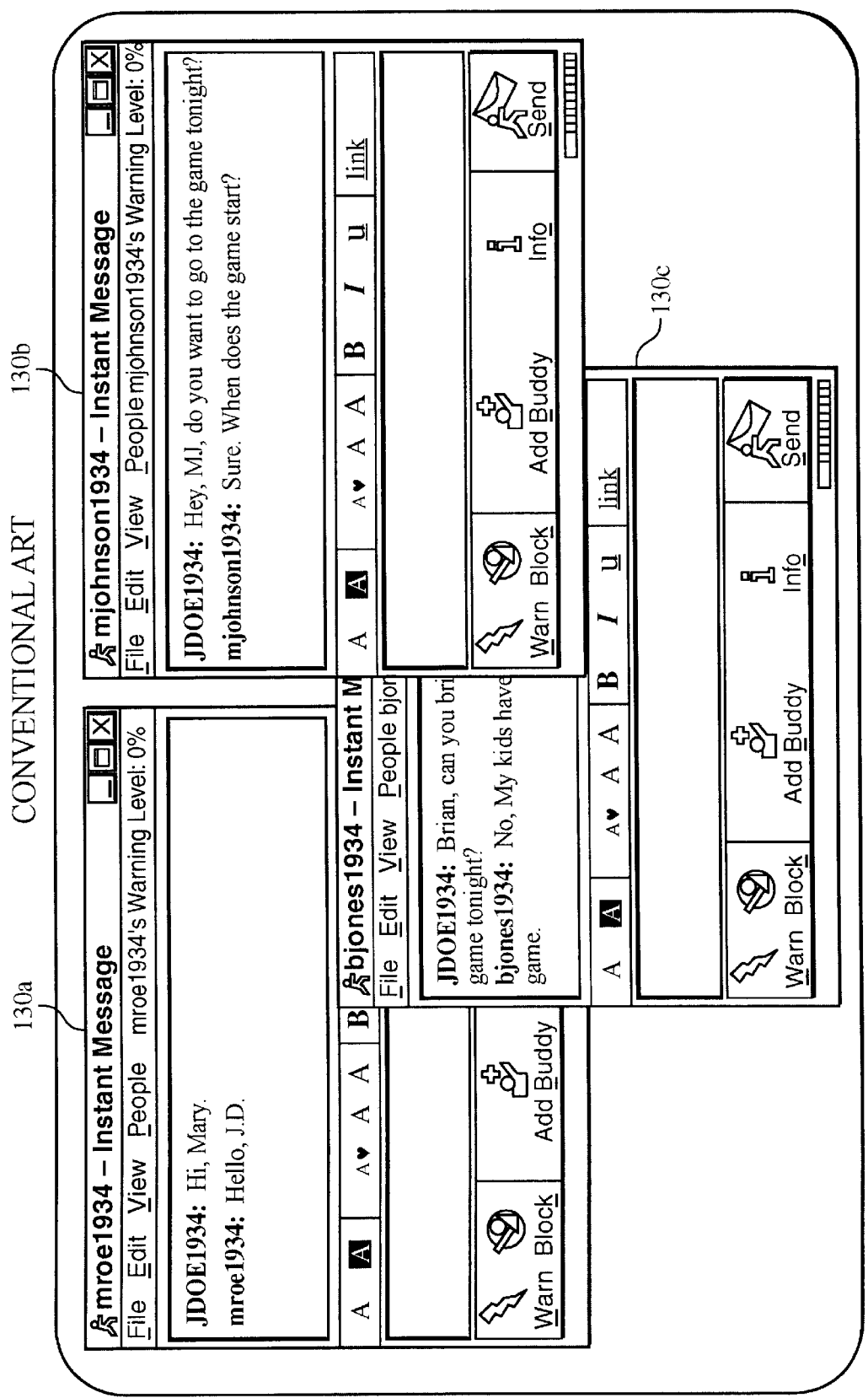
FIG. 5 shows a screen shot of a three instant messages windows in use at one time.
Figure 6:
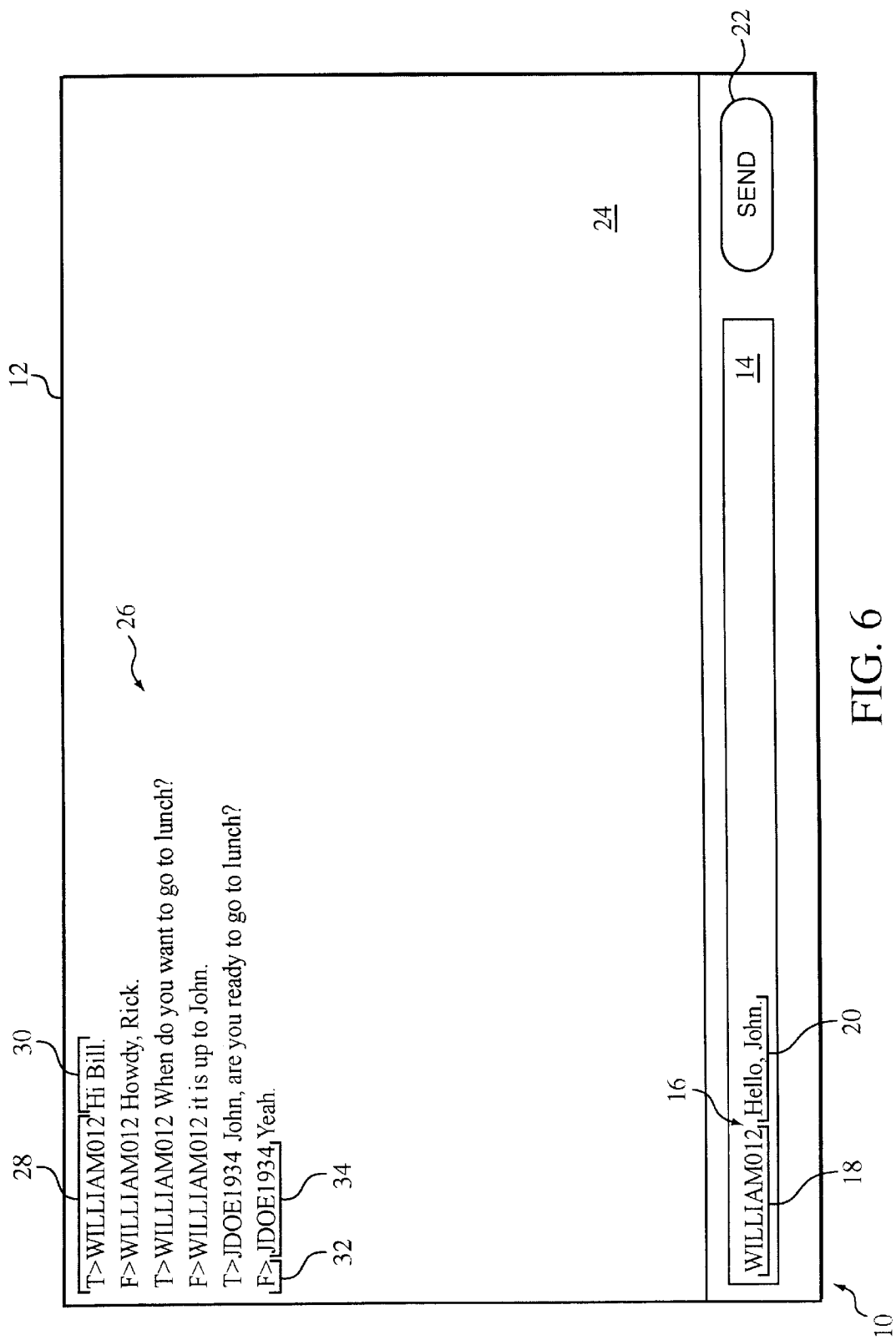
FIG. 6 is a schematic diagram of a messaging application user interface.

A messaging application (MA) user interface 10 is shown in FIG. 6. As used herein, MA refers to any software application or other software program (such as an operating system or utility) that allows users to exchange information electronically, including by way of example instant messaging applications, e-mail programs, chat programs, etc. The MA user interface 10 includes a user interface element 12 such as a window, console, dialog box, button, etc. The user interface element 12 has an input element 14 via which a user can input a message that is communicated to one or more other users of a computer system. For example, the input element 14 can be text field or a command line prompt in which the user enters a message 16 having an address 18 for whom the message 16 is intended and a message body 20 that contains the content of the message 16. The user interface element 12 also can include a button 22 or other user interface element that allows the user to send the message 16 to the address 18. Also, the MA user interface 10 can be configured so that the user can send the message 16 by pressing one or more keys on the keyboard (e.g., the "enter" key). Many other different MA user interface configurations are possible and depend largely on the design objectives of the MA developer.

The user interface element 12 also includes an output element 24 where messages that are sent and/or received by the user are displayed. For example, the output element 24 can be a text pane in which messages 26 are displayed. The messages 26 can each include address information 28 and a message body 30. The address information 28 can include a to/from field 32 and an address field 34. For example, the to/from field 32 can include first string (e.g., the string "T>") when the message 26 has been sent to the user associated with the address displayed in the address field 34, and a second string (e.g., the string "F>") when the message 26 has been received from the user that is associated with the address displayed in the address field 34. A user of the MA user interface 10 can participate in communication sessions (e.g., instant message exchanges, online chats, etc.) with one or more other users using the MA user interface 10 to address, enter, send, and display messages without having to open or switch between multiple windows.

When used in connection with an instant messaging application, the MA user interface 10 enables the user to interact with a single instance of a user interface (e.g., a window having an address entry field) by which the user can exchange instant messages with multiple other users. At the same time, the instant messages sent to these other users will appear to the recipients in the same manner as if the sender was using a conventional user interface. Moreover, although the exchanges with multiple other correspondents (e.g., WILLIAM012 and JDOE1934 shown in FIG. 6) are displayed in the same text pane 24 on the user's computer, that fact is not apparent to the correspondents (unless the user otherwise makes that fact known to the correspondents). Rather, exchanges with different correspondents are isolated from one another (e.g., WILLIAM012 and JDOE1934 will be unable to detect that they are engaging in IM exchanges with the same user, potentially at the same time).

Figure 7:
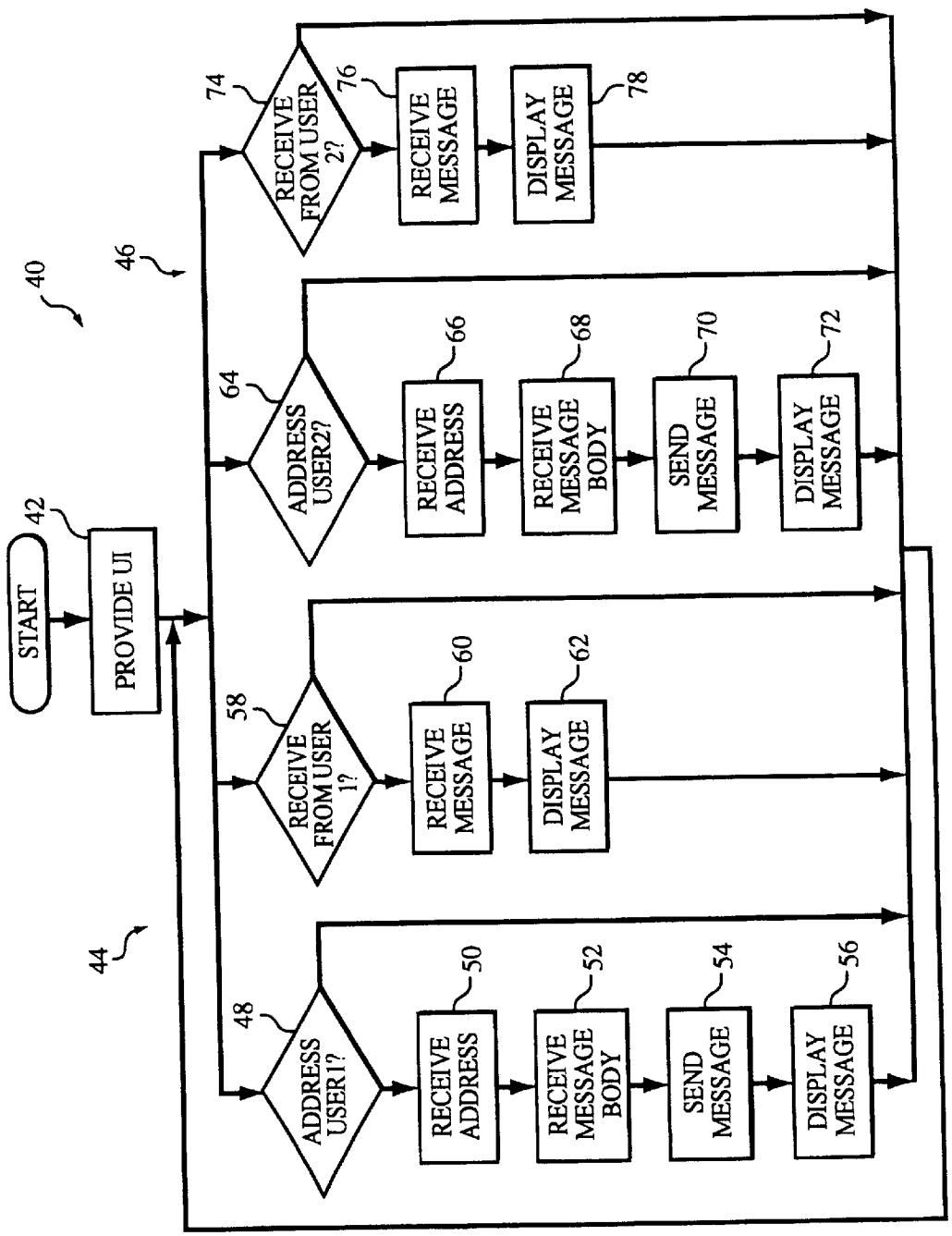
FIG. 7 is a flow diagram of a process of participating in multiple communication sessions.

A process 40 for participating in one or more communication sessions is shown in FIG. 7. In step 42, a MA user interface 10 is provided. In the example shown in FIG. 7, the MA user interface 10 is used to participate in two communication sessions 44 and 46 with first and second users, respectively.

Communication session 44 includes checking, in step 48, if a message is being addressed to the first user. If a message is being addressed to first user, then an address and message body for the message are received from the user via the MA user interface 10 in steps 50 and 52, respectively. Then, in step 54, the message is sent to the first user via the MA user interface 10. In step 56, the message is displayed in the MA user interface 10. When a message is received from the first user (which is checked in step 58), the message is received in step 60 and displayed in the MA user interface 10 in step 62.

Communication session 46 includes checking, in step 64, if a message is being addressed to the second user. If a message is being addressed to the second user, then an address and message body for the message are received from the user via the MA user interface 10 in steps 66 and 68, respectively. Then, in step 70, the message is sent to the second user via the MA user interface 10. In step 72, the message is displayed in the MA user interface 10. When a message is received from the second user (which is checked in step 74), the message is received in step 76 and displayed in the MA user interface 10 in step 78.

Figure 8:
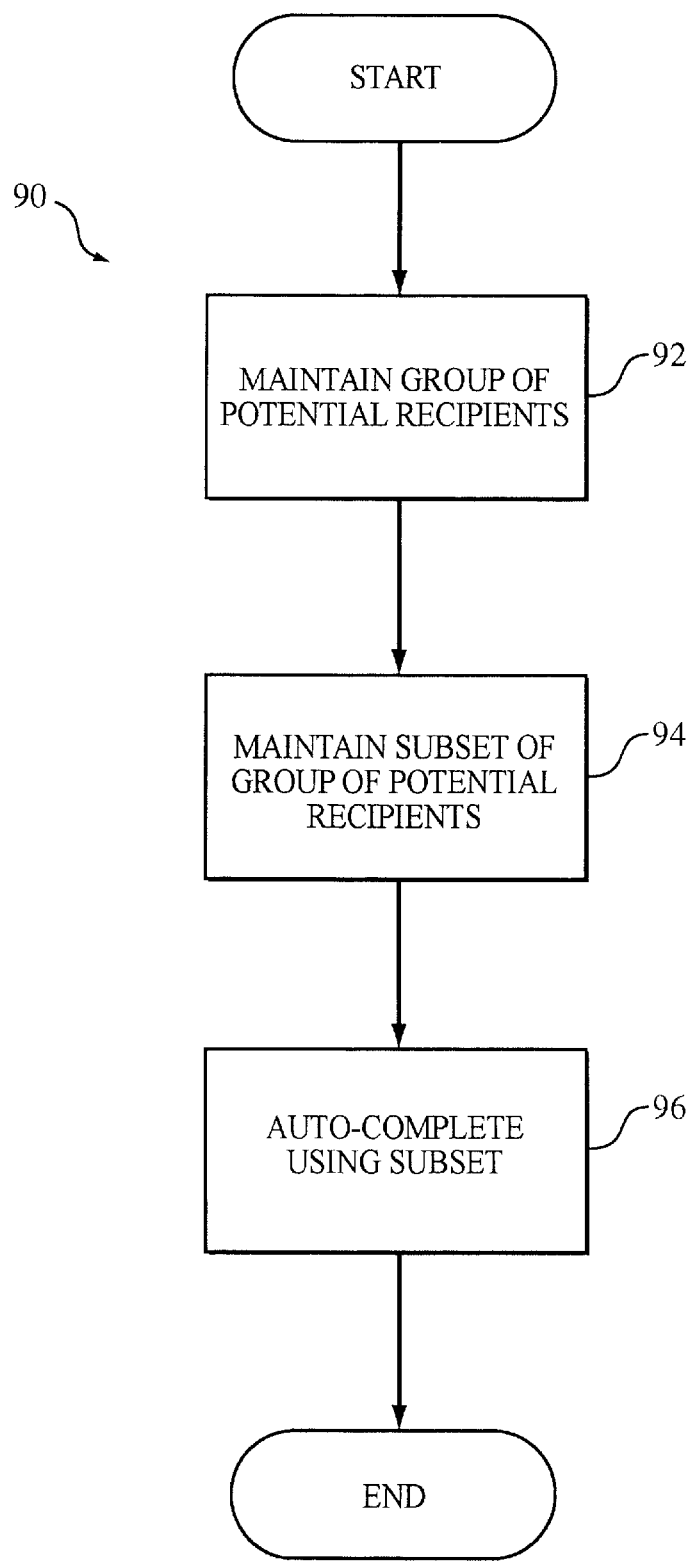
FIG. 8 is a flow diagram of a process of addressing a message.

A process 90 for addressing a message (e.g., a message that is entered via the MA user interface 10) is shown in FIG. 8. In step 92, a group of potential recipients of a message is maintained. For example in an instant message system, the group of potential recipients of an electronic message can comprise an address list 500, shown in FIG. 9, that includes entries 502 for each potential recipient of an instant message. Each entry 502 in the address list 500 contains an address field 504 in which an address (e.g., a user or screen name) for a potential recipient is stored, an online status field 506 that contains an indication of the online status of the person associated with the address stored in the address field 504, and a time stamp field 508 that contains the time when an instant message was sent to or received from the person associated with the address stored in the address field 504 during the current communication session, if any. The address list 500 can include an entry 502 for each person that is included in the user's buddy list. Alternatively, or in addition, the address list 500 can include an entry for each person to whom the user has sent a message during the current communication session and/or from whom the user has received a message during the current communication session.

Referring again to FIG. 8, a subset of the group of potential recipients is maintained using predetermined criteria in step 94. For example, in the case of an instant message system, a subset 510 (shown in FIG. 9) of the address list 500 can include the entries 502 for persons who are currently online, which is determined by checking the online status fields 506 of the entries 502. In step 96, shown in FIG. 8, the subset is used to attempt to auto-complete a partially entered address.

Figure 10:
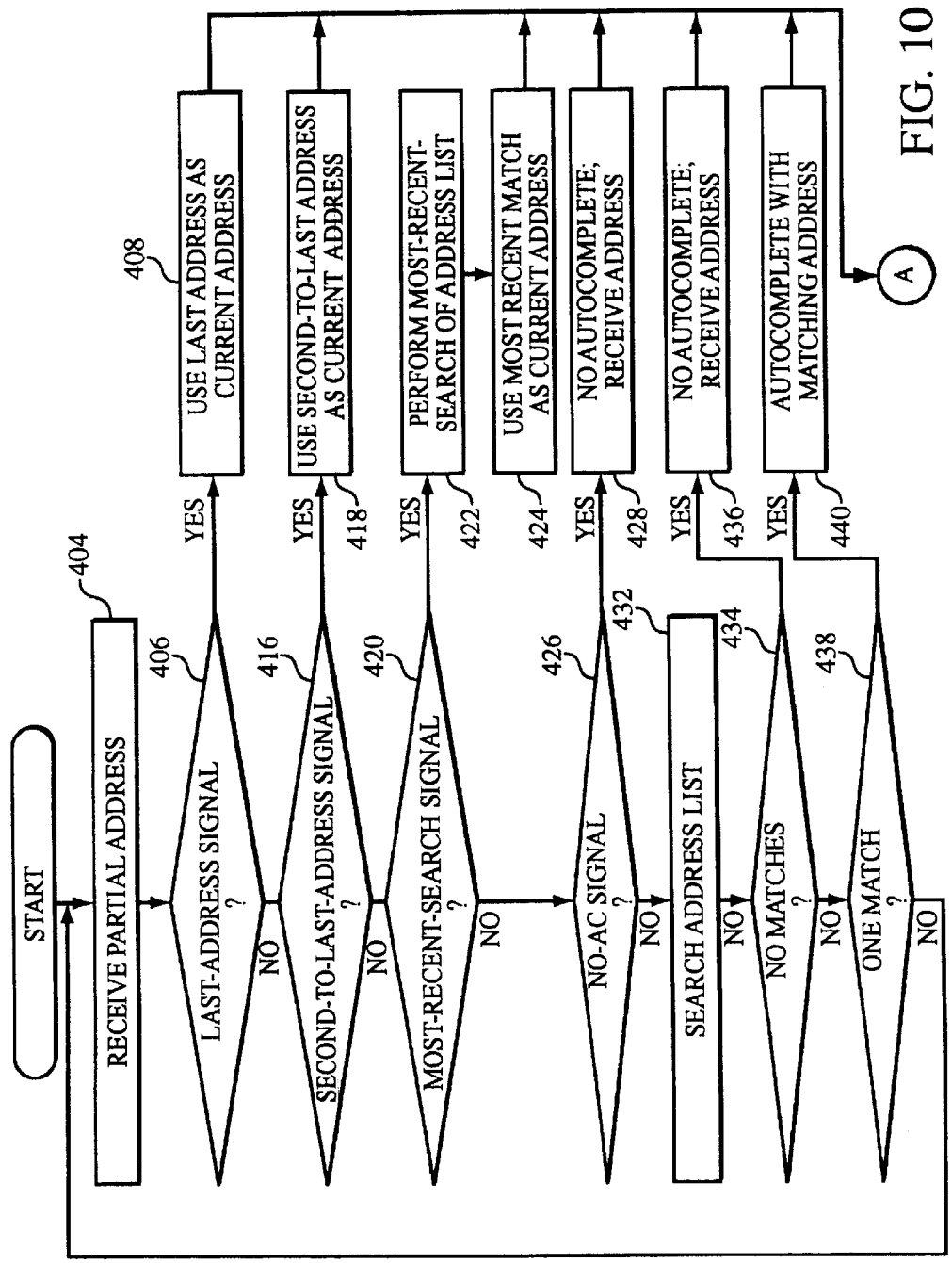
FIGS. 10–11 are flow diagrams of a process of automatically completing a message address.
Figure 11:
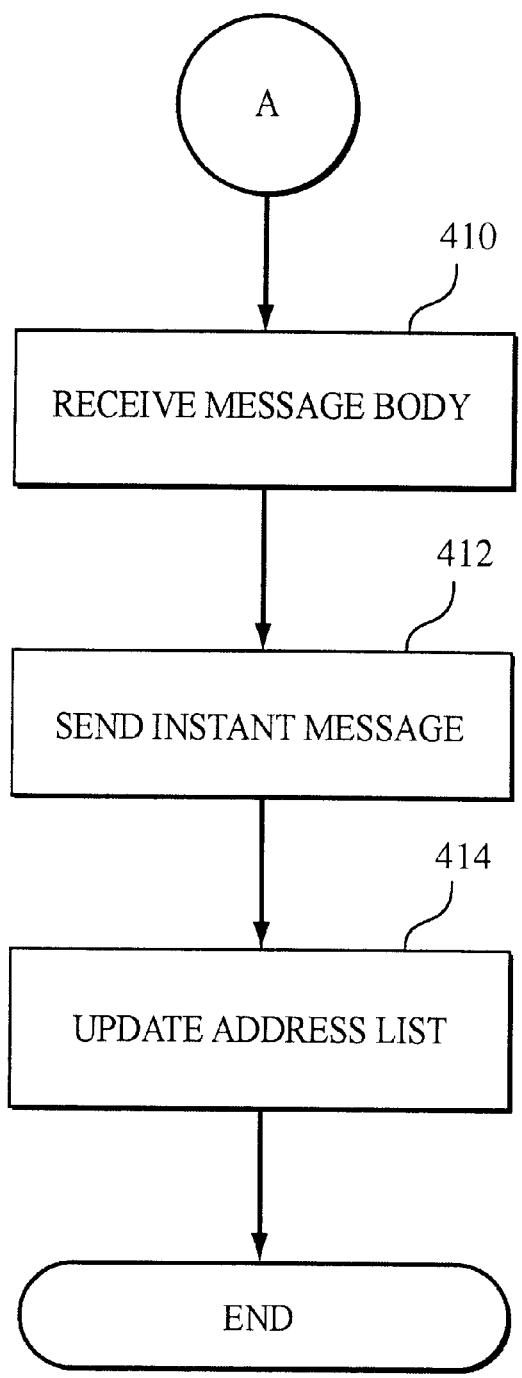

A process 400 for automatically completing a partial address that is entered in the input element 14 of a MA user interface 10 using a subset of potential message recipients (e.g. the subset 510) is shown in FIGS. 10–11. In step 404 shown in FIG. 10, a partial address is received from the user when the user enters the partial address in the input element 14 of the MA user interface 10 by pressing one or more keys on the keyboard.

In step 406, the partial address is checked to see if it contains a signal indicating, for example, that the address of the last instant message sent by the user (referred to as the "last address") should be used as the address for the current message. One way in the partial address can signal that the last address should be used is to have the first character of the partial address be a dot character (i.e., the period character or "."). followed by a separation character (e.g., a space). If the partial address indicates that the last address should be used for the current message, then in step 408 the last address is used as the address of the current message (with or without replacing the partial address in the input element 14 with the last address). Then in step 410 shown in FIG. 11, the body of the new message is received and, in step 412, the new message is sent to the user indicated by the last address. In step 414, the entry 502 in the address list 500 for the user to whom the current message was sent is updated (i.e., the time stamp field 508 is updated with the time when the current message was sent). Also, if an entry 502 in the address list 500 does not exist for the user to whom the current message was just sent, then an entry 502 for that user is added to the address list 500.

If the partial address does not include a last address signal, then in step 416 shown in FIG. 10 the partial address can be checked to see if the address of the second-to-last message sent by the user (referred to as the "second-to-last address") should be used as the address of the current message. One way in which the partial address can signal that the second-to-last address should be used as the address of the current message is by having the first two characters of the partial address be dot characters. If the partial address indicates that the second-to-last address should be used as the address of the current message, then in step 418 the second-to-last address is used as the address of the current message (with or without replacing the partial address in the input element 14 with the second-to-last address). Then, in step 410 shown in FIG. 11 the body of the current message is received, in step 412 the current message is sent, and in step 414 the address list 500 is updated.

If the partial address does not include a second-to-last signal, then in step 420 shown in FIG. 10 the partial address is checked to see if the subset 510 of the address list 500 should be searched for the most recent entry 502 corresponding to the partial address (referred to as a "most-recent search") in step 422. One way in which the partial address can signal that a most-recent search should be performed is by having the first character of the partial address be a dot character that is not followed by another dot character or the separation character. For example, if a partial address of ".a" is entered, the subset 510 is searched to identify the entry 502 beginning with the letter "a" that has the most recent time in its time stamp field 508. In step 424, the address contained in the address field 504 of the entry 502 corresponding to the partial address having the most recent time stamp is then used as the address of the current message. Then, in step 410 shown in FIG. 11 the body of the current message is received from the user, in step 412 the current message is sent, and in step 414 the address list 500 is updated.

If the partial address does not indicate that the last address or the second-to-last address should be used and does not indicate that a most-recent search should be performed, then in step 426 shown in FIG. 10 the partial address is checked to see if auto-completion of the address should be suspended for the current message. One way in which the partial address can signal that auto-completion should be suspended for the current message is by having the first character of the partial address be a semicolon or a colon. If the partial address indicates that auto-completion should not be performed for the current message, then the address of the current message is received from the user in its entirety (e.g., by having the user enter the rest of the address into the input element 14 of the MA user interface 10) in step 428. Then, in step 410 shown in FIG. 11 the body of the current message 26 is received, in step 412 the current message is sent, and in step 414 the address list 500 is updated.

It should be noted that the use of signals in general, and the particular signals shown in steps 406, 416, 420, and 426 in particular, are optional implementation features. According to the preferences of the MA developer, no signals could be used or different and/or additional signals could be implemented.

If the partial address does not indicate that auto-completion should be skipped for the current message, then in step 432 shown in FIG. 10 the subset 510 of the address list 500 is searched to see if there are any entries 502 that correspond to the partial address. For example, an entry 502 in the address list 500 can correspond to the partial address if the address field 504 of the entry 502 begins with the character or characters contained in the partial address.

If there are no entries in the subset 510 that match the partial entry (as checked in step 434), then auto-completion is not performed for the current message and the address of the current message is received from the user in its entirety in step 436. Then, in step 410 shown in FIG. 11 the body of the current message is received, in step 412 the current message is sent, and in step 414 the address list 500 is updated (e.g., an entry 502 for the address of the current message is added to the address list 500 shown in FIG. 9).

If there is only one entry 502 in the subset 510 that corresponds to the partial address (which is checked in step 438), then in step 440 auto-completion is performed for the current message using the entry 502 that corresponds to the partial address. For example, the address contained in the address field 504 of the corresponding entry 502 can be automatically entered by the MA in the input element 14 of the MA user interface 10 so that the user need not enter the remaining portion of that address. If it turns out that the address contained in the address field 504 of the corresponding entry 502 is not the address to which the user intended to send the current message, the user can edit the address, for example, by using the "backspace" key on the keyboard. After auto-completion is performed using the corresponding entry 502, the body of the current message is received in step 410 shown in FIG. 11, the current message is sent in step 412, and the address list 500 is updated in step 414.

If there is more than one entry 502 in the subset 510 that correspond to the partial address, then the process 400 loops back to step 404 to receive another partial address. Preferably when the process 400 loops back to step 404, the user can add to the partial address so as to reduce the number of entries 502 in the subset 510 that correspond to the partial address. For example, if a user's active subset 510 of address entries 502 includes both "Barry" and "Bartholomew" as potential auto-completion addresses, then the user would have to enter at least four characters (either "Barr" or "Bart") to uniquely identify a single entry 502 to be used for auto-completion.

Alternatively, the auto-completion feature could use a set of predefined rules to make educated "guesses" about which addressee was intended when the entered partial address was non-unique—that, it matched two or more entries of a user's active subset 510 of the address list 500. Assume, for example, that the user in the above example corresponded with Barry more recently than the user corresponded with Bartholomew. The auto-completion rule could be that, when non-unique partial addresses were entered, the address of the most recent correspondent would be used for auto-completion. In that case, when the user entered the first letter of the intended address, "b", the MA user interface would auto-complete the partial entry to "Barry" because Barry was corresponded with more recently than Bartholomew. If the user intended, however, to send the message to Bartholomew, the user could continue to enter characters until Bartholomew was uniquely identified. This same rule (use most recent correspondent that matches the partially entered address) could be expanded to the case were three or more potential auto-completion addressees had addresses that began with the same characters.

Another potentially useful rule for resolving non-unique partially entered addresses involves giving priority (in terms of auto-completion selection) to addressees in the user's buddy list over addresses not in the user's buddy list (but with whom the user had corresponded during the current session). Alternatively, or in addition, the user could specify expressly a desired order of priority for auto-completion of addresses starting with the same characters. In general, virtually any rule or set of rules could be applied to modify the auto-completion behavior according to the preferences of the MA developer.

Figure 12:
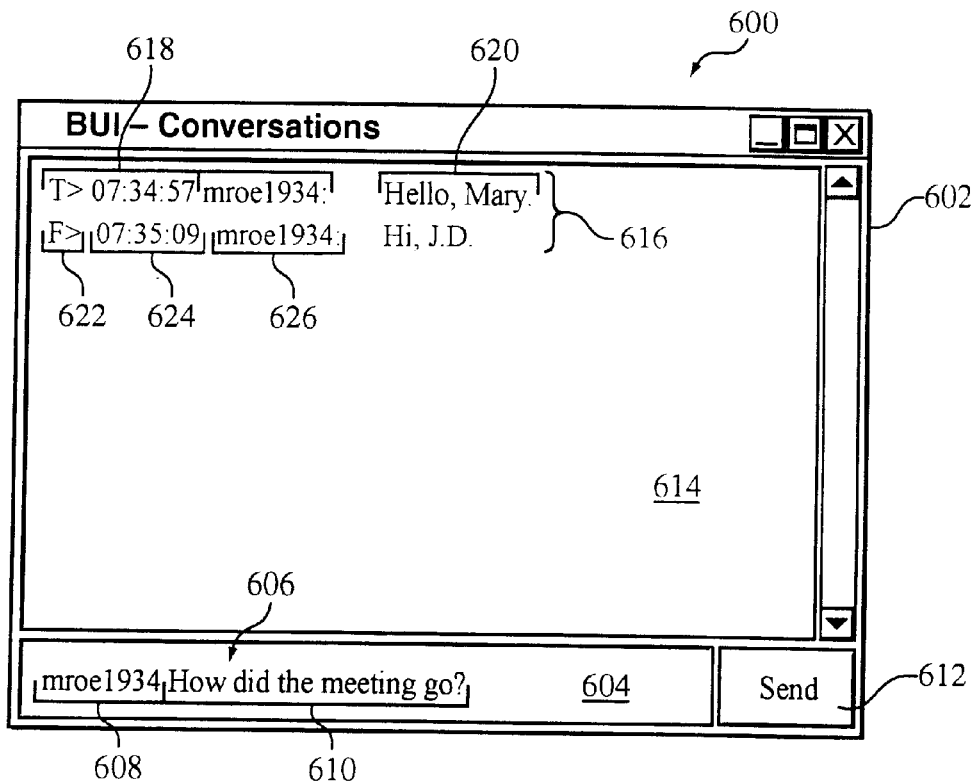
FIG. 12 shows a screen shot of a messaging application user interface used in AOL's Instant Messenger for UNIX.

FIG. 12 is a screen shot of a MA user interface 600 implemented in the UNIX-based version of AOL's IM client software (referred to as "Tik"). The MA user interface 600 includes a window 602 having a input text field 604. A user can enter a message 606 in the input text field 604. Message 606 includes an address 608 followed by a message body 610. The MA user interface 600 also includes a send button 612 on which the user can click in order to send the message 606 to the user associated with the address 608. In addition, the MA user interface 600 is configured to send the message 606 when the user presses a user-definable key (e.g., the "enter" key).

The MA user interface 600 also includes an output text field 614 where messages 616 that are sent and received by the MA user interface 600 are displayed. Each message 616 includes address information 618 and a message body 620. The address information 618 includes a to/from field 622, a time stamp field 624, and an address field 626. The string "T>" is inserted in the to/from field 622 when the message 616 is sent to the user associated with the address displayed in the address field 626, and the string "F>" is inserted in the to/from field 622 when the message is received from the user associated with the address displayed in the address field 626. The time at which the message 616 was sent or received is shown in the time stamp field 624, and the address of the sent or received message is displayed in the address field 626.

Figure 13:
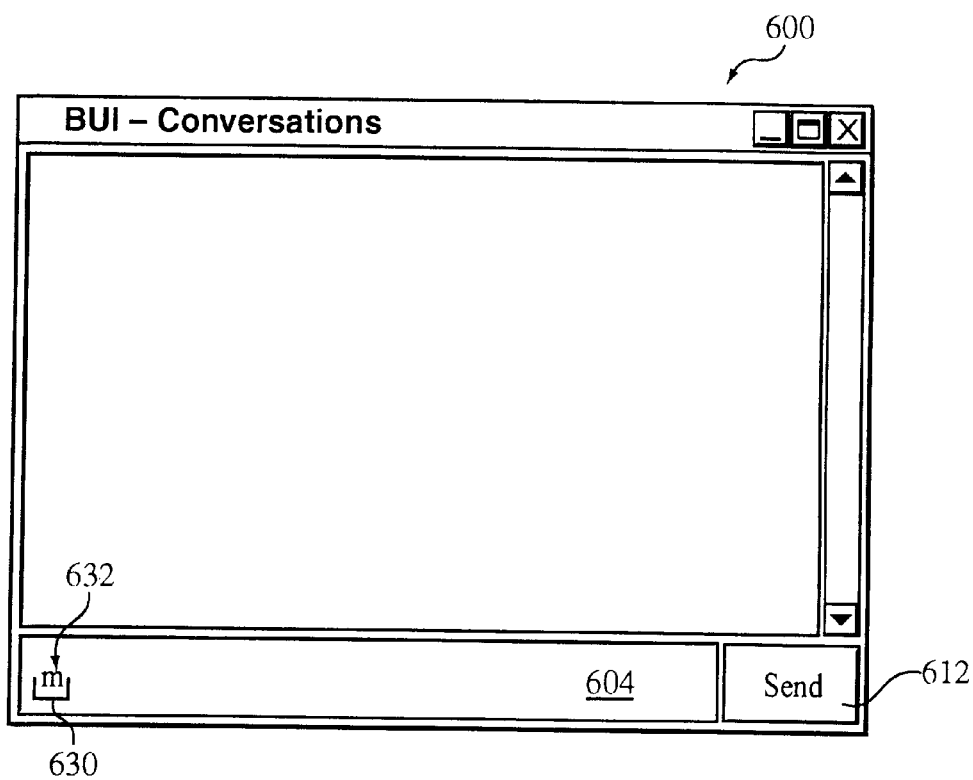
FIGS. 13–31 are screen shots showing the operation of the messaging application user interface of FIG. 12.
Figure 14:
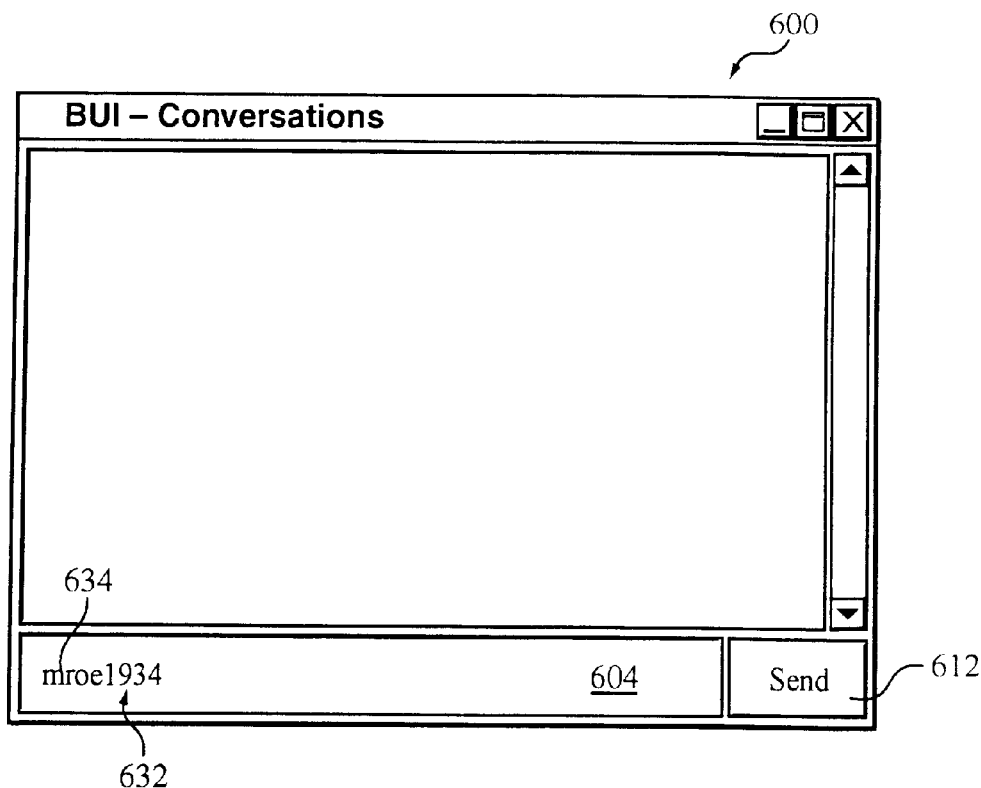

FIGS. 13–31 are screen shots showing the operation of the MA user interface 600 shown in FIG. 12. In FIG. 13, the user enters a partial address 630 (which comprises the letter "m") for a new message 632 in the input text field 604 of the MA user interface 600. The partial address 630 does not contain the last-address signal (which in this example is the dot character followed by the separation character), the second-to-last-address signal (which in this example is two dot characters), the most-recent search signal (which in this example is the dot character followed by a letter), or the no-auto-completion signal (which in this example is a semicolon). Therefore, the subset 510 of the address list 500 is searched for an entry 502 that corresponds to the partial address 630. Assuming for the purpose of this example that the subset 510 contains the entries shown in FIG. 9 when the partial address 630 is entered, the subset 510 will contain only one entry 502 that corresponds to the partial address 630 (i.e., the entry 502 that has an address field 504 that contains the address "mroe1934"). Therefore, the address mroe1934 is used to automatically complete the address 634 in the input text field 604 as shown in FIG. 14. That is, the MA user interface 600 uses the address mroe1934 as the address 634 and inserts the characters "roe1934" into the input text field 604 after the letter "m" without requiring the user to enter the characters "roe1934".

Figure 15:
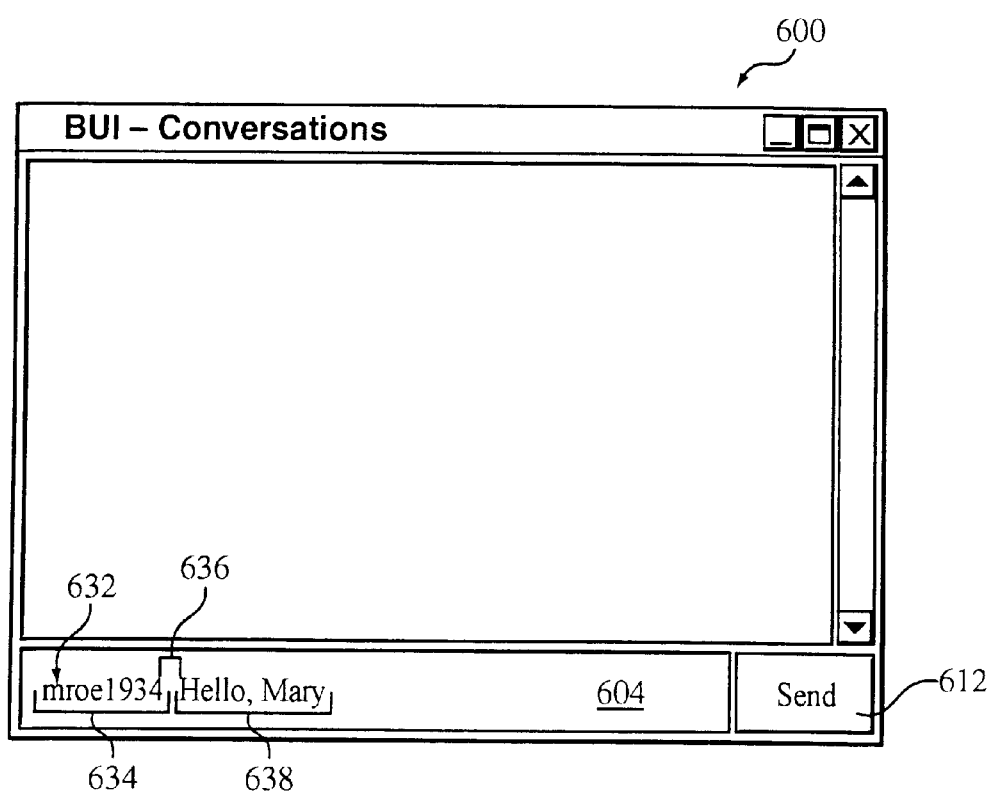

Then, as shown in FIG. 15, a separation character 636 is automatically appended to the end of the address 634. Then the user can enter the body 638 of the new message 632 (i.e., the text "Hello, Mary.") and send the new message 632, e.g., by clicking on the send button 612.

Figure 16:
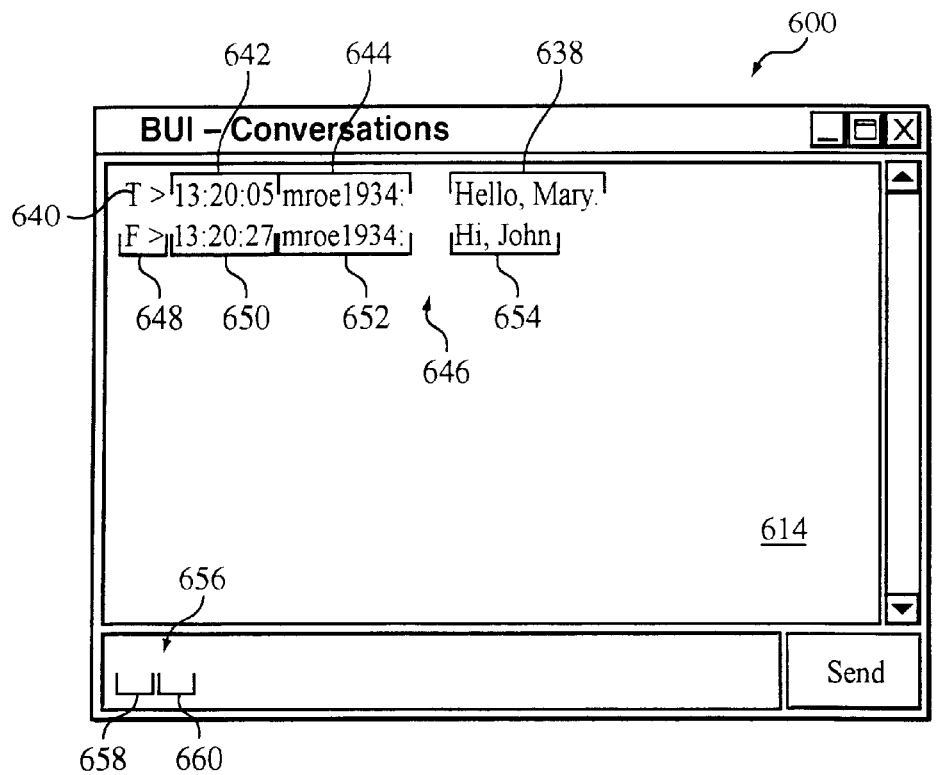

As shown in FIG. 16, after the user sends the message 632, a to/from field 640, a time stamp field 642, and an address field 644 corresponding to the message 632 are displayed in the output text field 614 of the MA user interface 600. The to/from field 640 contains the string "T>" in order to indicate that the message 632 was sent to the address "mroe1934," and the time stamp field 634 contains the time (i.e., "13:20:05") at which the message 632 was sent. Also, the message body 638 is displayed in the output text field 614 of the MA user interface 600. Moreover, the time stamp field 508 of the entry 502 for the user mroe1934 is updated to reflect when (i.e., "13:20:05") the message 632 was sent.

Then, the recipient of the message 632, mroe1934, sends a responsive message 646 to the user. The message 646 is also displayed in the output text field 614 and includes a to/from field 648, a time stamp field 650, an address field 652, and a message body 654. The to/from field 648 contains the string "F>" to indicate that the message 646 was received from mroe1934, and the time stamp field 650 contains the time (i.e., "13:20:27") at which the message 646 was sent. The address field 652 contains the address of the user from which the message 646 was sent, i.e., mroe1934. Also, as shown in FIG. 16, the message body 654 contains the text "Hi, John." Furthermore, the time stamp field 508 in the entry 502 for the user mroe1934 is updated to reflect when (i.e., "13:20:27") the message 646 was received.

Figure 17:
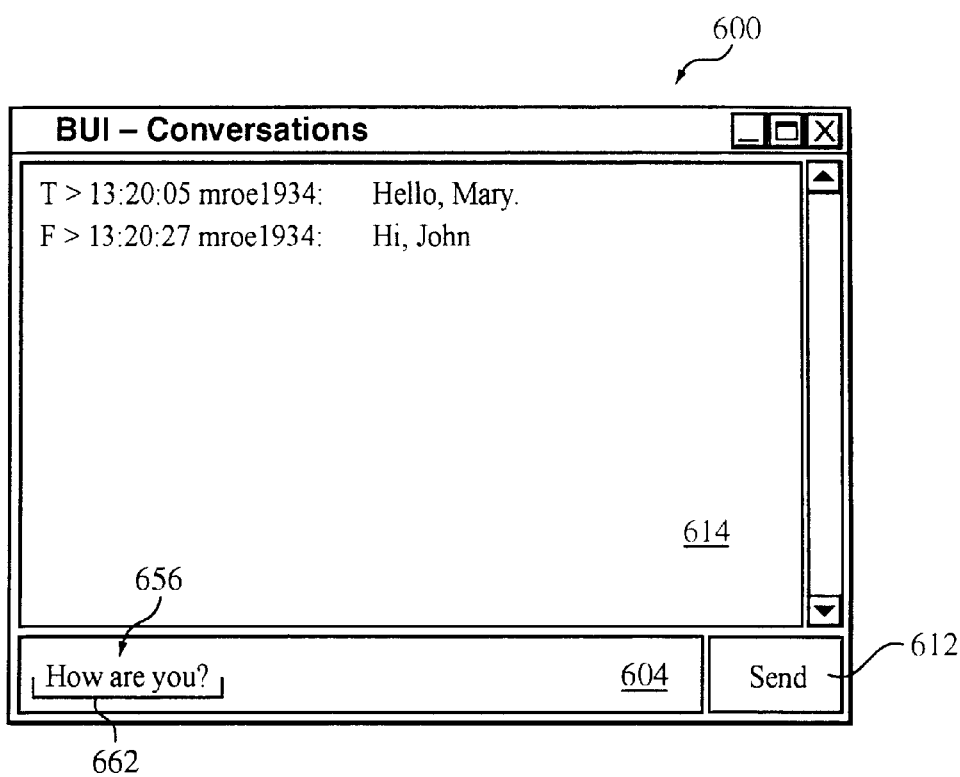

The user can then respond to the message 646 by entering a new message 656 in the input text field 604 of the MA user interface 600. As shown in FIG. 16, the user enters a dot character 658 followed by the separation character 660 (i.e., a space). Because a dot character followed by a separation character is the last-address signal in this example, the last address to which the user sent a message (i.e., mroe1934) is used as the address of the message 656. Then, as shown in FIG. 17, the MA user interface 600 receives a message body 662 (i.e., "How are you?") from the user. The user then sends the message 656, e.g., by clicking on the send button 612.

Figure 18:
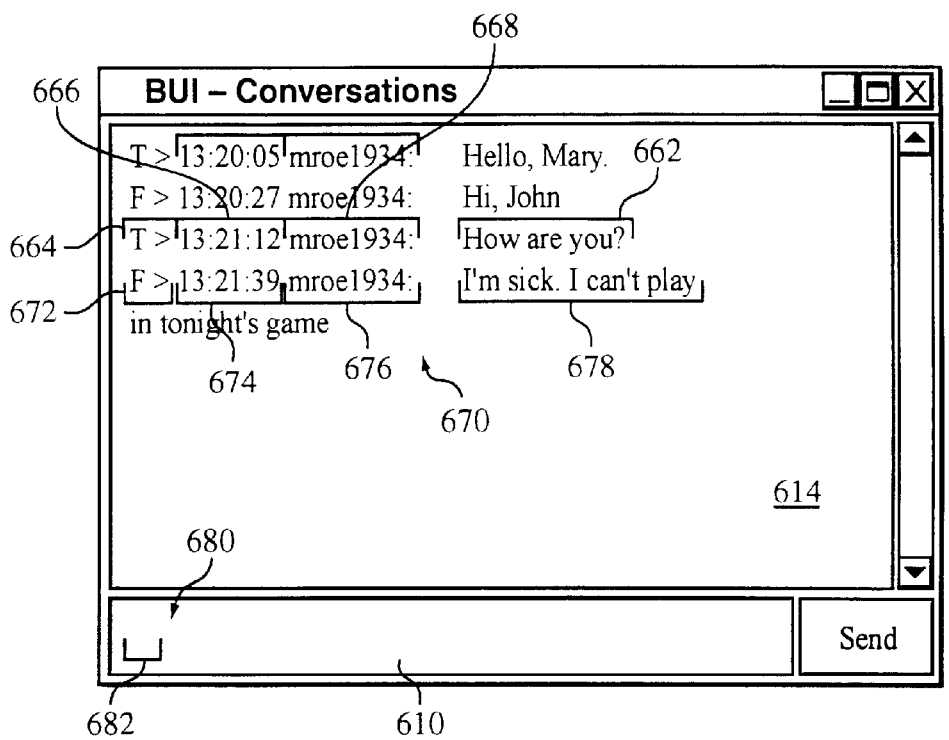

After sending the message 656, the MA user interface 600 displays in the output text field 614 a to/from field 664 (i.e., the string "T>"), a time stamp field 666 (i.e., "13:21:12"), and an address field 668 (i.e., mroe1934) corresponding to the message 656, as is shown in FIG. 18. Also, the MA user interface 600 displays the body 662 of the message 656 in the output text field 614. Furthermore, the time stamp field 508 of the entry 502 for the user mroe1934 is updated to reflect when (i.e., "13:21:12") the message 656 was sent.

The recipient of the message 656, mroe1934, then responds to the message 656 by sending a responsive message 670, which is displayed in output text field 614 of the MA user interface 600 as is shown in FIG. 18. The MA user interface 600 displays a to/from field 672 (i.e., "F>"), a time stamp field 674 (i.e., "13:21:39"), and an address field 676 (i.e., "mroe1934") corresponding to the user that sent the message 670. In addition, the MA user interface 600 displays a message body 678 (i.e., "I'm sick. I can't play in tonight's game."). Moreover, the time stamp field 508 of the entry 502 for the user mroe1934 is updated to reflect when (i.e., "13:21:39") the message 670 was received.

Figure 19:
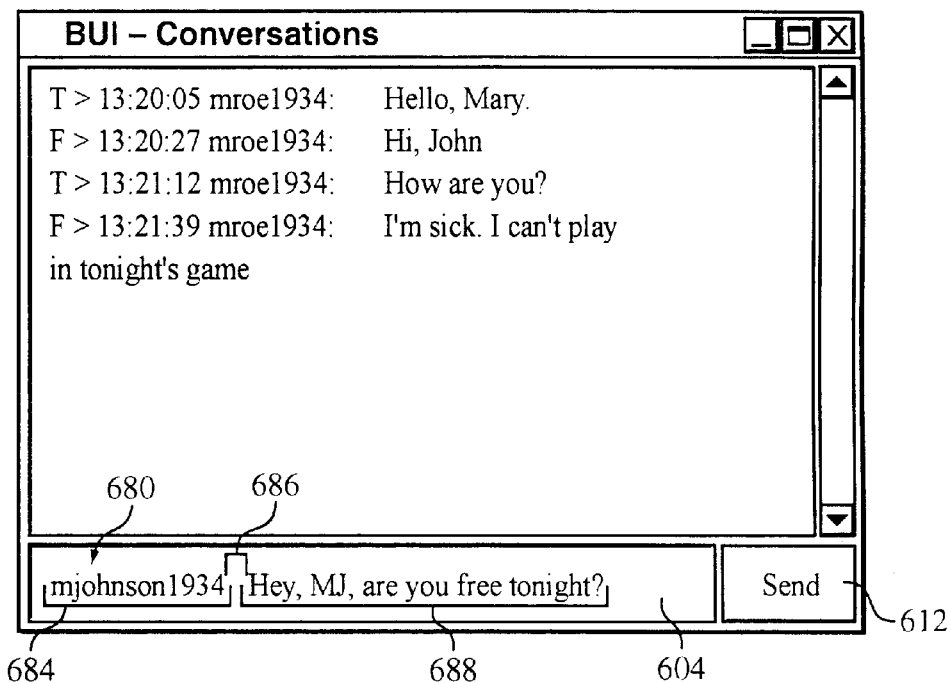
Figure 20:
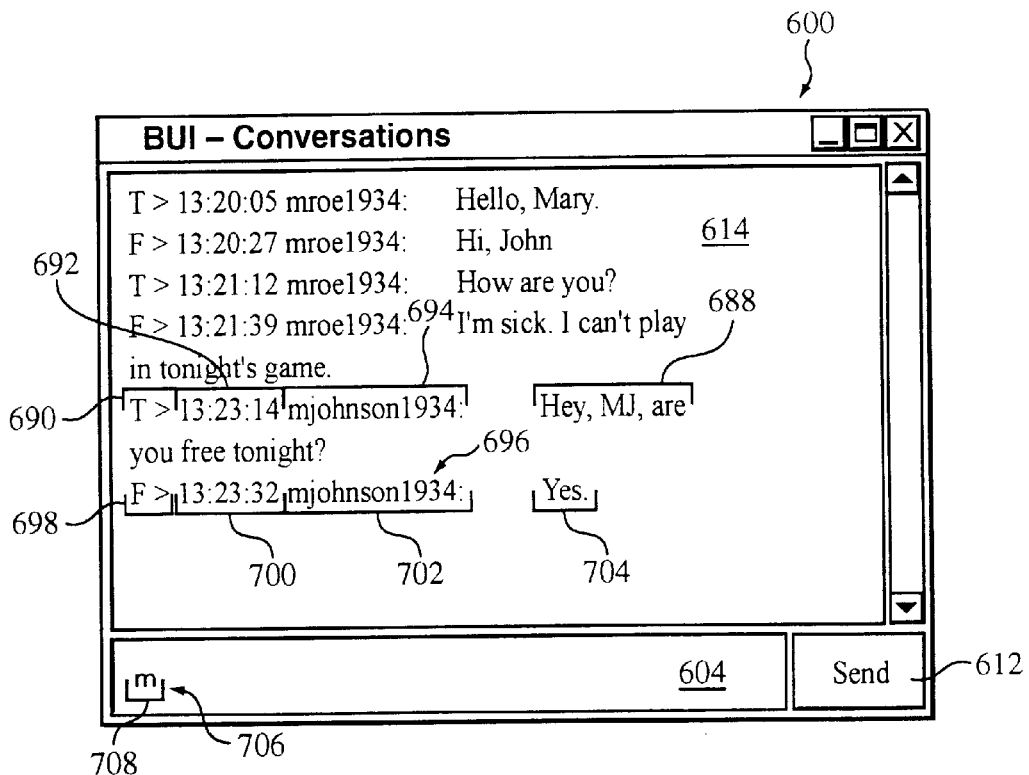

The user of the MA user interface 600 can then send a message 680 to a different user without opening a new window. To do so, the user types a partial address 682, shown in FIG. 18, that includes a semicolon. Because the semicolon is the no-auto-completion signal in this example, the MA user interface 600 does not search the subset 510 for an entry 502 that corresponds to the partial address 682. Instead, as shown in FIG. 19, the MA user interface 600 receives the address 684 (i.e., "mjohnson1934") from the user via the input text field 604. Also, the MA user interface 600 receives a separation character 686 (i.e., a space) and a message body 688 (i.e., "Hey, MJ, are you free tonight?") from the user via input text field 604. When the user clicks on the send button 612 (or otherwise instructs the MA interface 600 to send the message 680), the MA user interface 600 sends the message 680 and displays in the output text field 614 a to/from field 690 (i.e., "T>"), a time stamp field 692 (i.e., "13:23:14"), and an address field 694 (i.e., "mjohnson1934") for the message 680 as is shown in FIG. 20. Also, the MA user interface 600 displays the message body 688 in the output text field 614. Moreover, an entry 502 for the user mjohnson1934 is added to the address list 500 (and to the subset 510 as long as the user mjohnson1934 is online). The time stamp field 508 of the entry 502 for the user mjohnson1934 is updated to reflect when (i.e., "13:23:14") the message 680 was sent to the user mjohnson1934.

Then, as shown in FIG. 20, the MA user interface 600 receives a responsive message 696 from the user mjohnson1934. The MA user interface 600 displays a to/from field 698 (i.e., "F>"), a time stamp field 700 (i.e., "13:23:32") and an address field 702 (i.e., "mjohnson1934") from which the message 696 was sent. The MA user interface 600 also displays a message body 704 (i.e., "Yes.") of the message 696. Also, the time stamp field 508 of the entry 502 for the user mjohnson1934 is updated to reflect when (i.e., "13:23:32") the message 696 was received from the user mjohnson1934.

When, as shown in FIG. 20, the user attempts to send a responsive message 706 to the user mjohnson1934 by typing a partial address 708 that contains only the letter "m", the MA user interface 600 searches the subset 510 of the address list 500 for an entry 502 that corresponds to the partial address 708. The subset 510 is searched because the partial address 708 contains no special signals. As shown in FIG. 9, the subset 510 (which also contains an entry 502 for the user mjohnson1934) contains two addresses 502 that correspond to the partial address 708 (i.e., that have address fields 504 that begin with the letter "m"). If there is more than one corresponding entry 502 located by the search, the embodiment shown in FIG. 20 does not automatically complete the address and requires the user to provide additional address information.

Figure 21:
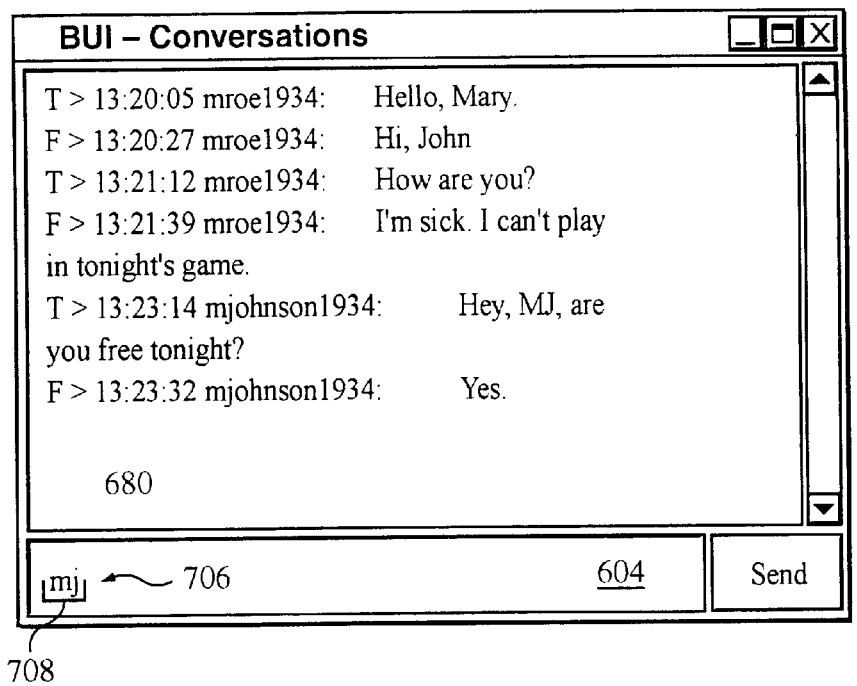
Figure 22:
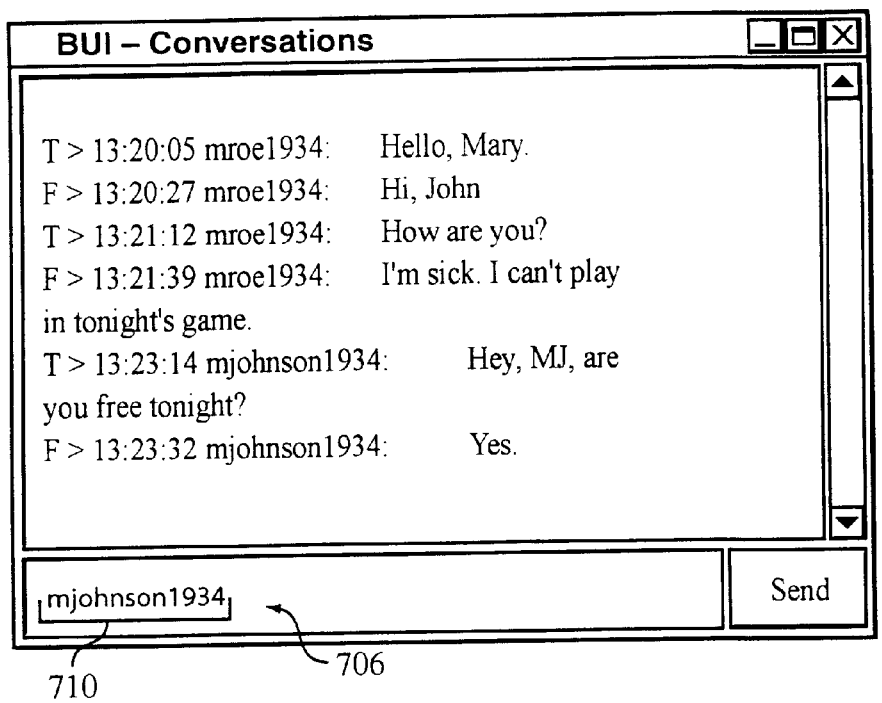
Figure 23:
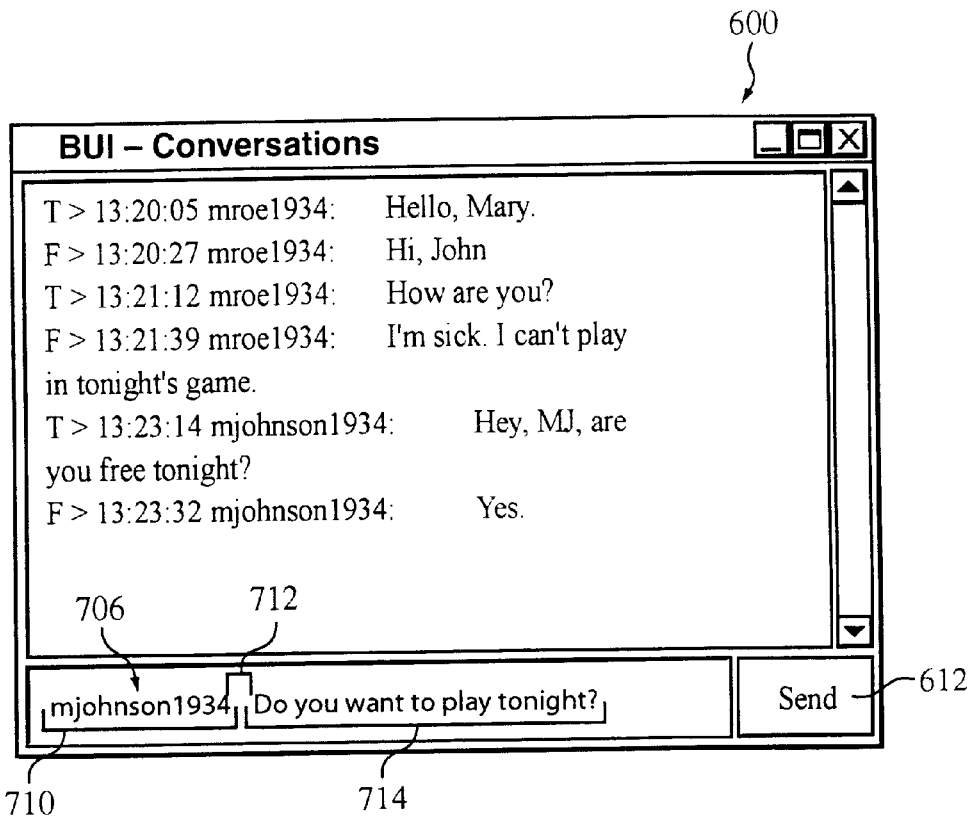
Figure 24:
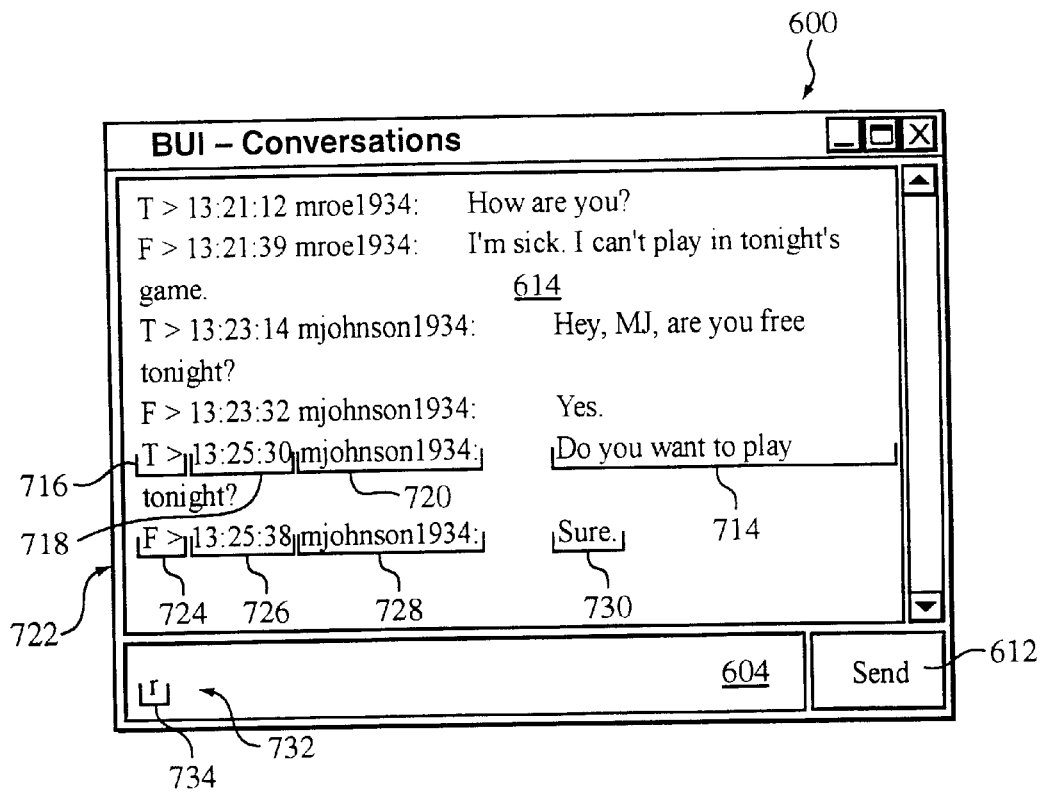

As shown in FIG. 21, the user enters the letter "j" via the input field 604 of the MA user interface 600. As a result, the partial address 708 contains the letters "mj". The MA user interface 600 then searches the subset 510 again for entries 502 that correspond to the partial address 708 (or alternatively, the MA user interface 600 could search only those entries 502 identified in the previous search). Because there is only one entry 502 in the subset 510 that corresponds to the partial address 708 "mj", i.e., mjohnson1934, the MA user interface 600 uses the address from the address field 504 of the corresponding entry 502 to automatically complete the address 710 in the input text field 604 as shown in FIG. 22. That is, the MA user interface 600 uses the address mjohnson1934 as the address 710 and inserts the characters "ohnson1934" into the input text field 604 after the letters "mj" without requiring the user to enter the characters "ohnson1934". Also, as shown in FIG. 23, a separation character 712 is automatically appended to the end of the address 710 by the MA user interface 600 during the auto-completion process. Then, as shown in FIG. 23, the MA user interface 600 receives a message body 714 (i.e., "Do you want to play tonight?") from the user via the input text field 604. When the user clicks on the send button 612 (or otherwise instructs the multiple IM user interface 600 to send the message 706), the MA user interface 600 sends the message 706. As shown in FIG. 24 after the user sends the message 706, the MA user interface 600 displays in the output text field 614 a to/from field 716 (i.e., "T>"), a time stamp field 718 (i.e., "13:25:30"), and an address field 720 (containing the address mjohnson1934). In addition, the MA user interface 600 displays the message body 714 in the output text field 614. Also, the time stamp 508 of the entry 502 for the user mjohnson1934 is updated to reflect when (i.e., "13:25:30") the message 706 was sent to the user mjohnson1934.

Then, as shown in FIG. 24, the MA user interface 600 receives a responsive message 722 from the user mjohnson1934. The MA user interface 600 displays a to/from field 724 (i.e., "F>"), a time stamp field 726 (i.e., "13:25:38") and an address field 728 (i.e., mjohnson1934) from which the message 722 was sent. The MA user interface 600 also displays a message body 730, which contains the text "Sure." Also, the time stamp field 508 of the entry 502 for the user mjohnson1934 is updated to reflect when (i.e., "13:25:38") the message 722 was received from the user mjohnson1934.

Figure 25:
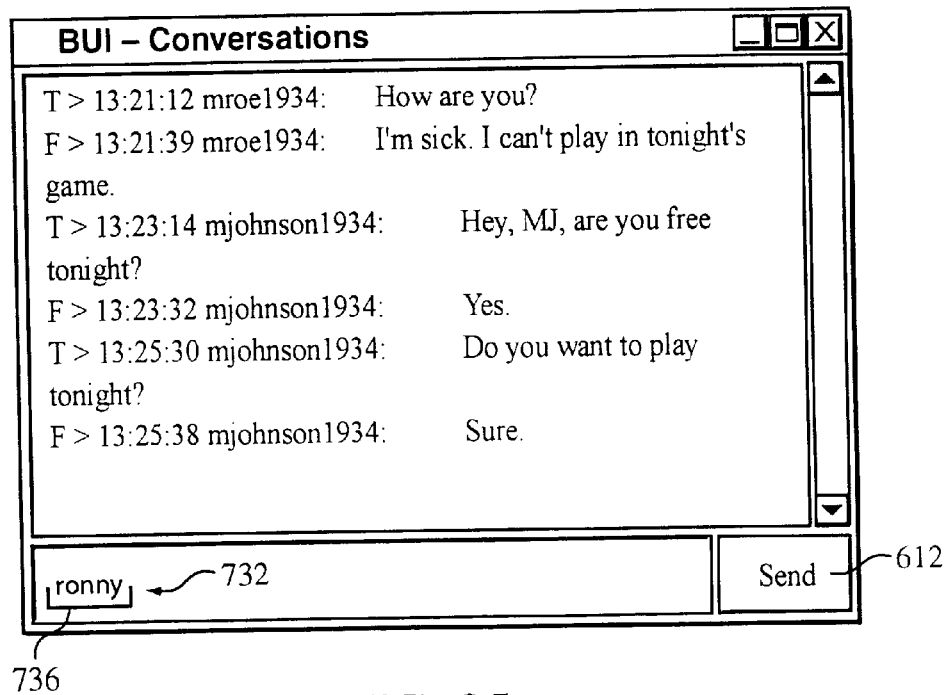
Figure 26:
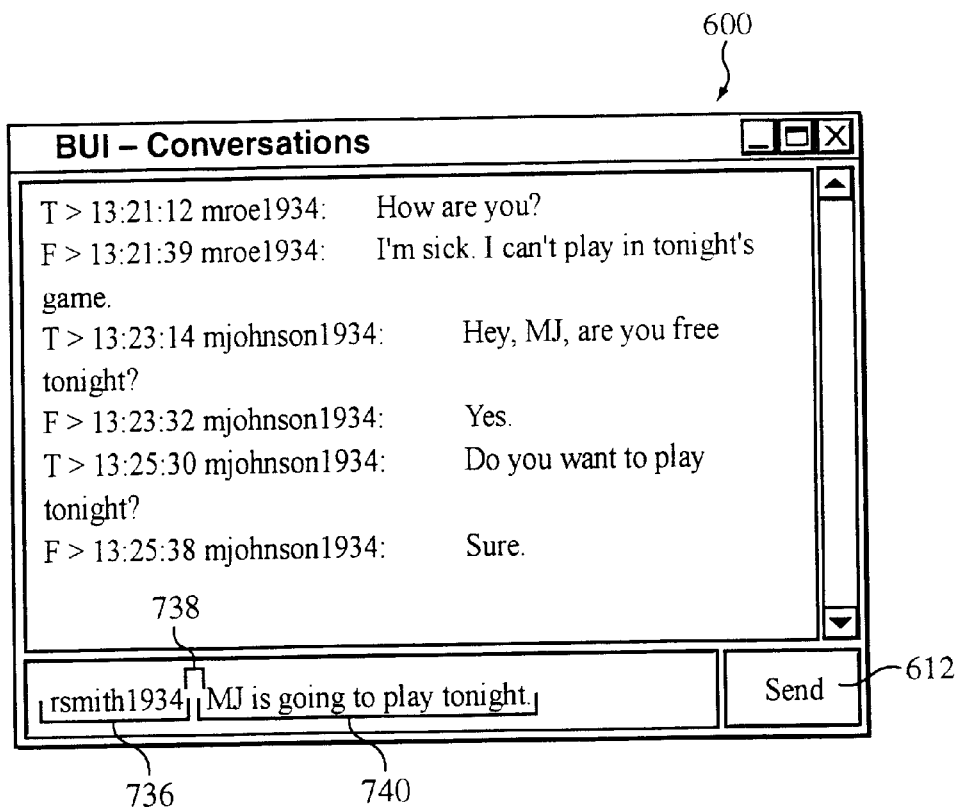

Then the user begins to enter a new message 732. Specifically, as shown in FIG. 24, the user enters a partial address 734 that includes only the letter "r". The subset 510 of the address list 500 is searched for a corresponding entry 502 because the partial address 734 contains none of the special signals. As shown in FIG. 9, the subset 510 (which also contains an entry for the user mjohnson1934) contains an entry 502 that corresponds to the partial address 734 (i.e., the entry 502 for the user "ronny"). As shown in FIG. 25, the corresponding address ronny is sued to auto-complete the address 736 by inserting the characters "onny" in the input text area 604 after the letter "r". However, the user intended to address the message 732 to the user at address "rsmith1934". So, the user users the "backspace" key to delete the letters "onny" from the input text area 614 and enters the letters "smith1934" after the letter "r" to address the message 732 to rsmith1934 as shown in FIG. 26. Also, the user enters a separation character 738 (i.e., a space) and a message body 740 (i.e., "MJ, is going to play tonight.") in the input text area 604 after the address 736.

When user the clicks on the send button 612 (or otherwise instructs the multiple IM user interface 10 to send the message 732), the MA user interface 600 sends the message 732 and displays in the output text field 614 a to/from field 742 (i.e., "T>"), a time stamp field 744 (i.e., "13:27:17"), and an address field 746 (i.e., rsmith1934). Also, the MA user interface 600 displays the message body 740 in the output text field 614. Also, an entry 502 for the user rsmith1934 is added to the address list 500 (and the subset 510 as long as the user rsmith1934 remains online) and the time stamp 508 of that entry 502 is updated to reflect when (i.e., "13:27:17") the message 722 was sent to the user rsmith1934.

Figure 27:
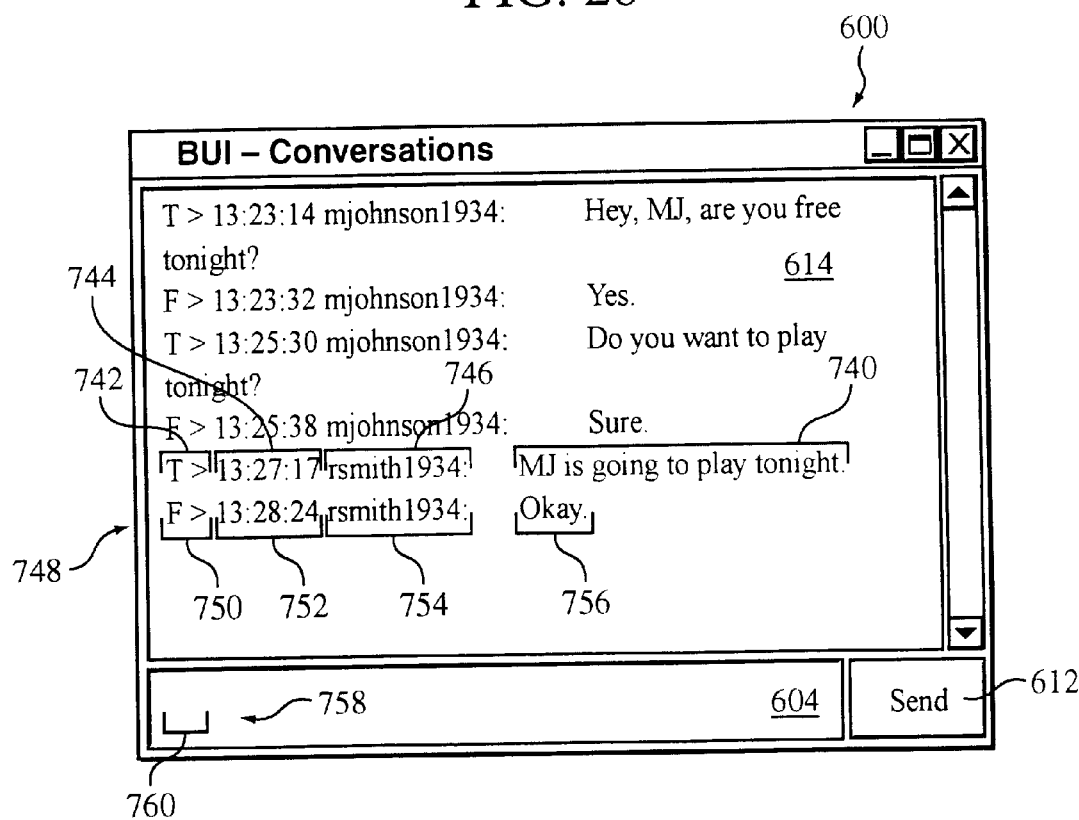

A responsive message 748 is received from the user rsmith1934 and is displayed in the output text field 614 of the MA user interface 600. Specifically, as shown in FIG. 27, a to/from field 750 (i.e., "F>"), a time stamp field 752 (i.e., "13:28:24"), an address field 754 (i.e., rsmith1934), and a message body 756 (i.e., "Okay.") is displayed in the output text field 614. Also, the time stamp field 508 of the entry 502 for the user rsmith1934 is updated to reflect when (i.e., "13:28:24") the message 748 was received.

Figure 28:
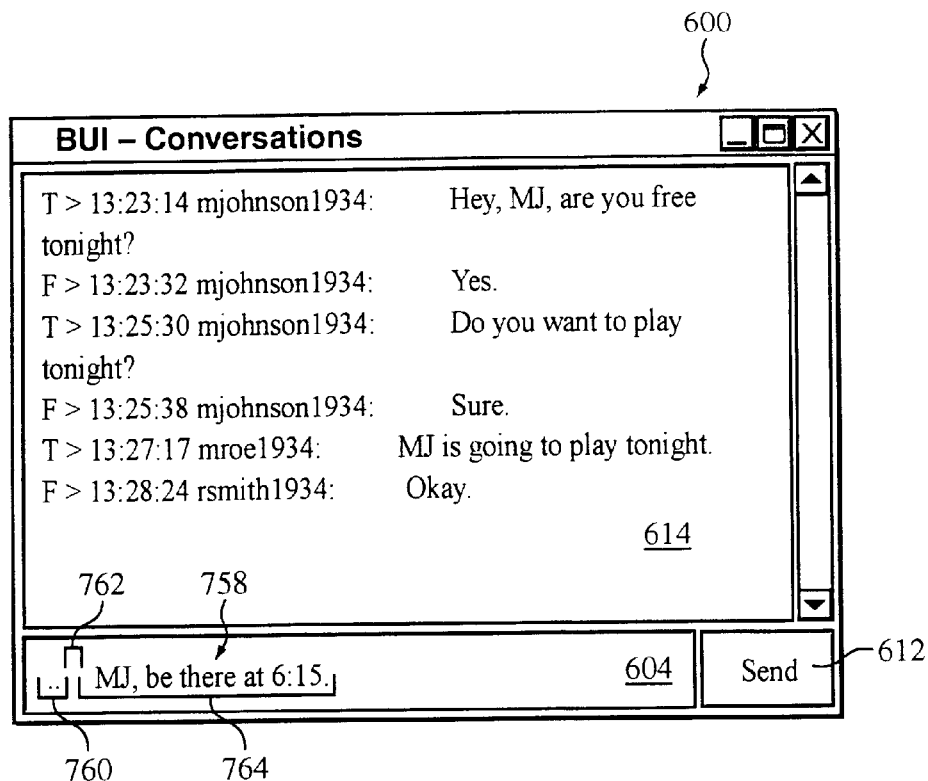

In FIG. 27, the user addresses a message 758 to the user mjohnson1934 by using the second-to-last-address signal. Specifically, the user enters in the input text field 604 a partial address 760 that includes two dot characters. The MA user interface 600 receives the partial address 760 and uses the address of the second-to-last user to whom the user sent a message (in this case, the user mjohnson1934) as the address of the message 758. As shown in FIG. 28, the MA user interface 600 then receives a separation character 762 (i.e., a space) and a message body 764 (i.e., "MJ, be there at 6:15."). The user then sends the message 758 by clicking on the button 612.

Figure 29:
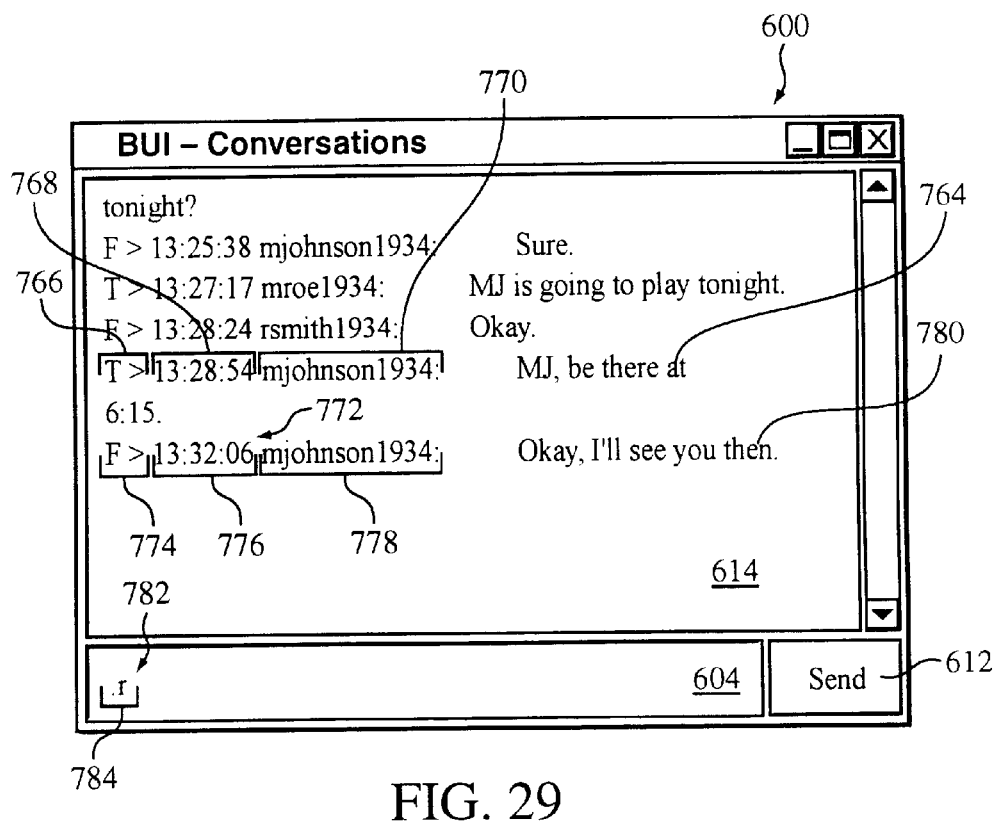

After the message 758 is sent, the message 758 is displayed in the output text area 614 of the MA user interface 600. Specifically, as shown in FIG. 29, a to/from field 766 (i.e., "T>"), a time stamp field 768 (i.e., "13:30:54"), an address field 770 (i.e., mjohnson1934), and the message body 764 are displayed in the output text field 614. Also, the time stamp field 508 of the entry 502 for the user mjohnson1934 is updated to reflect when (i.e., "13:30:54") the message 758 was sent.

A responsive message 772 is received from the user mjohnson 1934 and is displayed in the output text field 614. Specifically, as shown in FIG. 29, a to/from field 774 (i.e., "F>"), a time stamp field 776 (i.e., "13:32:06"), an address field 778 (i.e., mjohnson1934), and a message body 780 (i.e., "Okay, I'll see you then.") are displayed in the output text field 614. Also, the time stamp 508 of the entry 502 for the user mjohnson1934 is updated to reflect when ("13:32:06") the message 772 was received.

Figure 30:
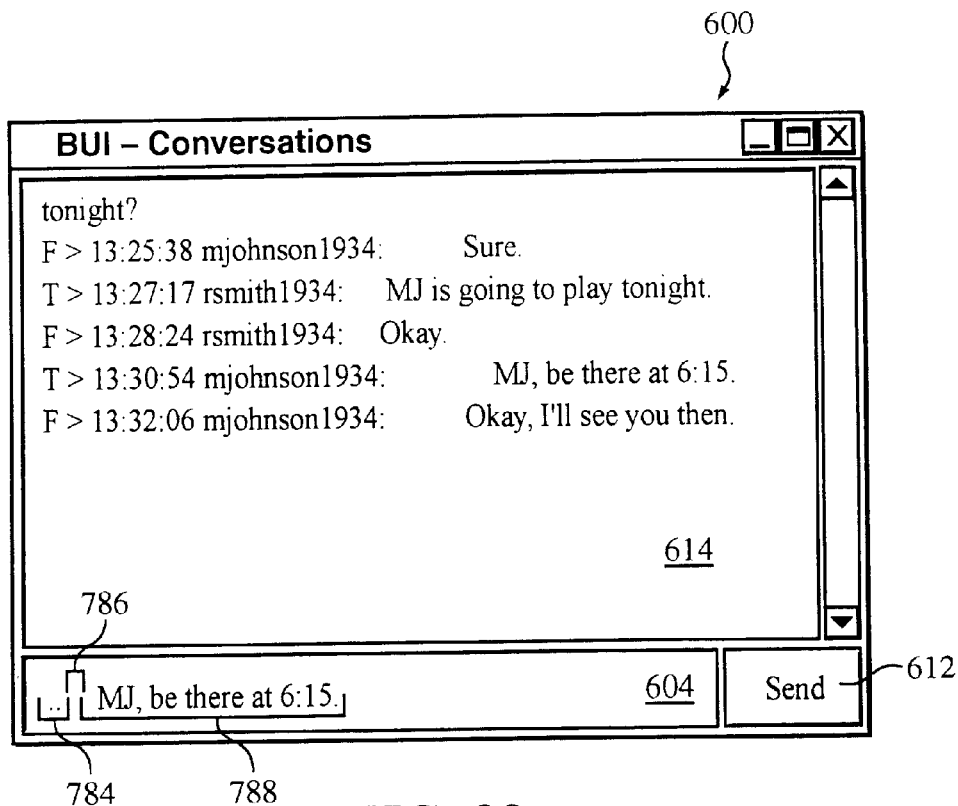

As shown in FIG. 29, the user of the MA user interface 600 then addresses a message 782 to user rsmith1934 by using the most-recent-search signal. Specifically, the user enters in the input text field 604 a partial address 784 that includes the letters ".r". The MA user interface 600 receives the partial address 784 and determines that the partial address 784 contains the most-recent-search signal. Then, as shown in FIG. 30, the MA user interface 600 receives a separation character 786 (i.e., the space character) and a message body 788 (i.e., "We are going to meet at 6:15."). Then, the user clicks the send button 612.

Figure 31:
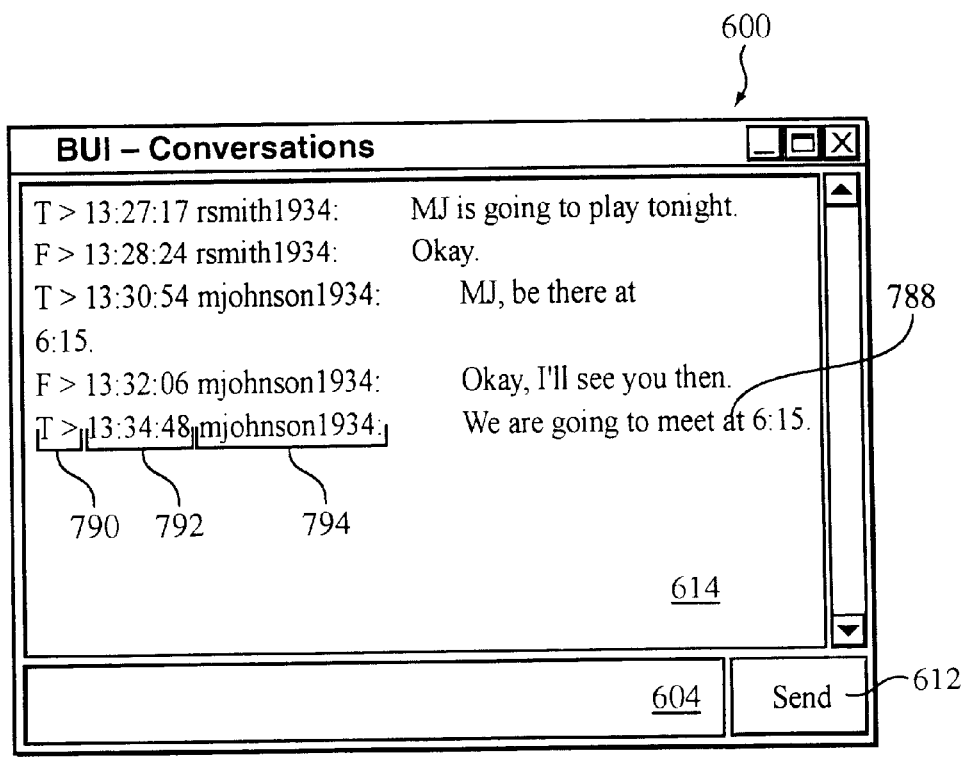

The MA user interface 600 then searches the subset 510 address list 500 for the most recent entry 502 corresponding to the partial address 784. Although there are two entries 502 in the subset 510 that correspond to the partial address 784 (i.e., the address "ronny" and "rsmith1934"), a message was sent to the address rsmith1934 more recently than to the address ronny. Therefore, the message 782 is addressed and sent to rsmith1934. As shown in FIG. 31 a to/from field 790 (i.e., "T>"), a time stamp field 792 (i.e., "13:34:48"), an address field 794 (i.e., rsmith1934), and the message body 788 are displayed in the output text field 614. Moreover, the time stamp field 508 of the entry 502 for the user rsmith1934 is updated to reflect when (i.e., "13:34:48") the message 782 was sent.

Although the example shown in FIGS. 13–31 relates to an instant messaging application, it is to be understood that the auto-completion techniques and systems described here can be used in other applications, such as mobile phone dialing or entering operation system or application commands. Moreover, the auto-completion features described above can be used in other MAs such as e-mail and chat clients. In the chat room context, such auto-completion could be used when a user wants to specify another recipient to whom a "whisper" message (i.e., a message seen only by the designated recipient and not by the other chat room participants) is to be sent.

Various implementations of the systems and techniques described here may be realized in digital electronic circuitry, or in computer hardware, firmware, software, or in combinations thereof. A system or other apparatus that uses one or more of the techniques and methods described here may be implemented as a computer-readable storage medium, configured with a computer program, where the storage medium so configured causes a computer system to operate on input and/or generate output in a specific and predefined manner. Such a computer system may include one or more programmable processors that receive data and instructions from, and transmit data and instructions to, a data storage system, and suitable input and output devices.

Each computer program may be implemented in a high-level procedural or object-oriented programming language, or in assembly or machine language if desired; and in any case, the language may be compiled or interpreted language. Suitable processors include, by way of example, both general and special purpose microprocessors.

Generally, a processor will receive instructions and data from a read-only memory and/or a random access memory. Storage devices suitable for tangibly embodying computer program instructions and data include all forms of non-volatile memory, including semiconductor memory devices, such as EPROM, EEPROM, and flash memory devices; magnetic disks such as internal hard disks and removable disks; magneto-optical disks; and CD-ROM disks.

Any of the foregoing may be supplemented by, or implemented in, specially-designed ASICs (application-specific integrated circuits).

A number of embodiments have been described. Nevertheless, it will be understood that various modifications may be made without departing from the spirit and scope of the invention. Accordingly, other embodiments are within the scope of the following claims.

What is claimed is:

1. A computer-implemented method of addressing an instant message to a member of a plurality of potential instant message recipients, each potential instant message recipient having an associated instant message address, the method comprising:
   accessing a subset of the plurality of potential instant message recipients that is generated based on a predetermined criterion;
   enabling auto-completion of a partially entered instant message address text based on the subset of potential instant message recipients; and
   modifying the enabled auto-completion based on a predetermined signal.

2. The method of claim 1, further comprising searching the subset for a potential instant message recipient having an associated instant message address that corresponds to the partially entered instant message address text; and
   if a potential instant message recipient that corresponds to the partially entered instant message address text is found in the subset, auto-completing the partially entered instant message address text using the instant message address associated with the corresponding potential instant message recipient.

3. The method of claim 2, wherein the predetermined signal modifies searching the subset for the potential instant message recipient corresponding to the partially entered instant message address text so that it includes identifying a potential instant message recipient to whom an instant message was most recently sent.

4. The method of claim 2, wherein searching the subset for a potential instant message recipient corresponding to the partially entered instant message address includes identifying a potential instant message recipient to whom an instant message was most recently sent.

5. The method of claim 1, wherein the predetermined signal modifies the enabled auto-completion to enable auto-completion of the partially entered instant message address using the instant message address of the last instant message sent if the partially entered instant message address includes a predetermined signal.

6. The method of claim 1, wherein the predetermined signal modifies the enabled auto-completion to enable auto-completion of the partially entered instant message address using the instant message address of the second-to-last message sent if the partially entered instant message address includes a predetermined signal.

7. The method of claim 1, wherein the predetermined criterion includes a potential instant message recipient in the subset if the potential instant message recipient is a member of a buddy list and the potential instant message recipient is currently online.

8. The method of claim 7, wherein the address text of the instant message is a user name of the potential instant message recipient to whom the instant message is addressed.

9. The method of claim 7, wherein currently online includes the potential instant message recipient being online when the partially completed address is being autocompleted.

10. The method of claim 1, wherein the predetermined criterion is used to include a potential instant message recipient in the subset if an instant message has been sent to the potential instant message recipient by a computer user entering the partially entered address text during a current communication session and the potential instant message recipient is currently online.

11. The method of claim 10, wherein currently online includes the potential instant message recipient being online when the partially completed address is being autocompleted.

12. The method of claim 1, wherein the predetermined criterion includes a potential instant message recipient in the subset if an instant message has been received from the potential instant message recipient during the current communication session and the potential instant message recipient is currently online.

13. The method of claim 12, wherein currently online includes the potential instant message recipient being online when the partially completed address is being autocompleted.

14. The method of claim 1, wherein the predetermined signal is added to and included with the partially entered instant message text such that the enabled auto-completion is modified based on a signal that is added to and included with the partially entered instant message text.

15. A method of addressing electronic messages to users of a computer network, the method comprising:
   providing a set of user-selectable command line signals that modify behavior of an enabled auto-completion feature by decreasing a group of candidate auto-completion entries to at least one candidate auto-completion entry; and
   auto-completing the partially entered address text based on at least one candidate auto-completion entry and an entry of one or more of the set of signals.

16. The method of claim 15, wherein the set includes a last-address signal, and the message is addressed to the recipient of the last message sent when the last-address signal is entered.

17. The method of claim 15, wherein the set includes a second-to-last address signal, and the message is addressed to the recipient of the second-to-last message sent when the second-to-last-address signal is entered.

18. The method of claim 15, wherein the set includes a no-auto-completion signal, and no auto-completion is performed when the no-autocompletion signal is entered.

19. The method of claim 15 wherein providing a set of user-selectable command line signals that modify includes providing a set of user-selectable signals that modify, but do not disable, behavior of an enabled auto-completion feature by decreasing a plurality of auto-completion entries in an address list.

20. The method of claim 15 wherein the set includes at least two user-selectable command line signals.

21. The method of claim 15, wherein the command-line signal is added to and included with the partially entered instant message text such that the enabled auto-completion is modified based on a signal that is added to and included with the partially entered instant message text.

22. An instant messaging user interface comprising:
   a user interface element having:
      an input element for receiving instant messages for more than one separate instant message exchange;
      an output element for displaying instant messages for more than one separate instant message exchange; and
      software in a computer-readable medium comprising instructions for causing the user interface to perform the following operations:
         receive a partial address for an instant message;
         maintain a subset of a group of potential instant message recipients, the subset being determined using a predetermined criterion; and
         enabling auto-completion of partial address using the subset, wherein the predetermined criterion is used to include a potential instant message recipient in the subset if an instant message has been received from the potential instant message recipient during the communication session and the potential instant message recipient is currently online.

23. A protocol for addressing a message to a member of a plurality of potential message recipients, each potential message recipient having an associated address, the protocol comprising:
   one or more user-selectable command line signals for modifying behavior of an enabled auto-completion feature; and
   a predetermined criterion for selecting a subset of the plurality of potential message recipients.

24. The protocol of claim 23 wherein the one or more user-selectable command line signals for modifying behavior includes one or more user-selectable command line signals for modifying, but not disabling, behavior of an enabled auto-completion feature.

25. The protocol of claim 23 wherein the one or more user-selectable command line signals includes at least two user-selectable command line signals.

26. The protocol of claim 23 wherein the command line signals are added to and included with a partially entered address text for a message.

27. A computer-implemented method of addressing a message to a member of a plurality of potential message recipients, each potential recipient having an associated address, the method comprising:
   accessing a subset of the plurality of potential message recipients generated based on a predetermined criterion; and
   enabling the auto-completion of a partially entered address based on the subset of potential message recipients, wherein the predetermined criterion is used to include a potential message recipient in the subset if a message has been received from the potential message recipient during the communication session.

28. The method of claim 27, further comprising:
   searching the subset for a potential message recipient having an associated message address that corresponds to the partially entered message address; and
   if a potential message recipient that corresponds to the partially entered message address is found in the subset, auto-completing the partially entered message address using the message address associated with the corresponding potential message recipient.

29. The method of claim 28, wherein the predetermined criterion is used to further include a potential message recipient in the subset if the last message sent was to the potential message recipient.

30. The method of claim 28, wherein the predetermined criterion is used to further include a potential message recipient in the subset if the second-to-last message sent was to the potential message recipient.

31. The method of claim 28, wherein the predetermined criterion is used to further include a potential message recipient in the subset if the potential message recipient is a member of a buddy list and the potential message recipient is currently online.

32. The method of claim 31, wherein the address of the instant message is a user name of the potential message recipient to whom the message is addressed.

* * * * *